United States Patent [19]
Steenackers

[11] Patent Number: 5,484,575
[45] Date of Patent: Jan. 16, 1996

[54] CATALYTIC CONVERTER FOR THE CATALYTIC TREATMENT OF EXHAUST GAS

[75] Inventor: Pieter D. Steenackers, Heverlee, Belgium

[73] Assignee: Scambia Industrial Developments Aktiengesellschaft, Schaan, Liechtenstein

[21] Appl. No.: 303,285

[22] Filed: Sep. 8, 1994

Related U.S. Application Data

[63] Continuation of Ser. No. 878,425, May 4, 1992, abandoned.

[30] Foreign Application Priority Data

May 2, 1991 [CH] Switzerland .............................. 1316/91

[51] Int. Cl.⁶ .............................. B01D 50/00; F01N 3/08
[52] U.S. Cl. .............................. 422/176; 422/169; 55/442; 55/445; 55/463; 55/483; 60/298; 60/299; 60/324
[58] Field of Search .............................. 422/176, 179, 422/180, 169; 55/DIG. 30, 418, 442, 445, 463, 483; 60/298, 299, 324

[56] References Cited

U.S. PATENT DOCUMENTS

| | | | |
|---|---|---|---|
| 3,088,271 | 5/1963 | Smith | 422/177 |
| 3,434,806 | 3/1969 | DeRycke | 23/288 |
| 3,649,215 | 3/1972 | Perga et al. | 422/179 |
| 3,685,972 | 8/1972 | De Palma et al. | 422/179 |
| 3,801,289 | 4/1974 | Wiley | 422/179 |
| 3,838,977 | 10/1974 | Warren | 60/299 |
| 3,989,471 | 11/1976 | Nowak | 55/DIG. 30 |
| 4,125,380 | 11/1978 | Negola | 422/180 |
| 4,175,107 | 11/1979 | Iwaoka et al. | 422/114 |
| 4,264,561 | 4/1981 | Goedicke | 60/299 |
| 4,277,443 | 7/1981 | Van der Smissen et al. | 422/122 |
| 4,278,639 | 7/1981 | Tadokoro et al. | 422/179 |
| 4,285,909 | 8/1981 | Mizusawa et al. | 422/180 |
| 4,335,078 | 6/1982 | Ushijima et al. | 422/179 |
| 4,344,922 | 8/1982 | Santiago et al. | 422/179 |
| 4,427,423 | 1/1984 | Montierth | 55/DIG. 30 |
| 4,629,605 | 12/1986 | Santiago | 422/179 |
| 4,818,497 | 4/1989 | Andersson et al. | 422/179 |
| 4,969,264 | 11/1990 | Dryer et al. | 422/179 |
| 5,065,576 | 11/1991 | Kanazawa et al. | 60/299 |
| 5,089,236 | 2/1992 | Clerc | 422/168 |
| 5,104,627 | 4/1992 | Usui et al. | 422/179 |
| 5,110,560 | 5/1992 | Presz, Jr. et al. | 422/180 |
| 5,119,551 | 6/1992 | Abbot | 422/180 |

FOREIGN PATENT DOCUMENTS 2062487  5/1981  United Kingdom.

OTHER PUBLICATIONS

Chemical Engineers' Handbook, Perry et al., 4th edition 1963. pp. 5–30–5–31.

*Primary Examiner*—Robert J. Warden
*Assistant Examiner*—N. Bhat
*Attorney, Agent, or Firm*—Anderson Kill Olick & Oshinsky

[57] ABSTRACT

The catalytic converter has a casing with an inlet and an outlet and a gas-permeable catalyst element which is arranged in the casing and has an exhaust gas entry surface. A guide surface which faces the orifice of the inlet, is a distance away from its edge and makes an angle of preferably at least 60° and, for example, 90° with the stated axis is present in the casing. The inlet has an inner surface with a cylindrical or slightly conical inner surface section which, in the orifice region of the inlet, is continuously connected to a counter-surface opposite the guide surface by a transition surface section which extends in an arc-like manner towards the inner space of the housing in a section through the axis of the inlet. The exhaust gas flowing through the inlet can be deflected by the guide surface with little pressure loss and can then flow into the element, uniformly distributed over the exhaust gas entry surface of the element.

44 Claims, 6 Drawing Sheets

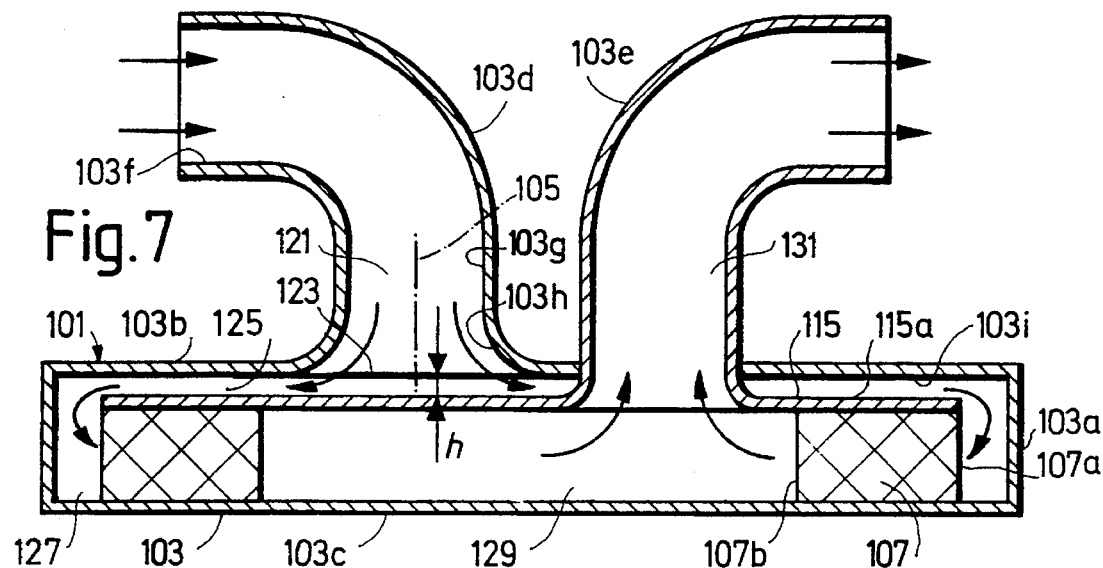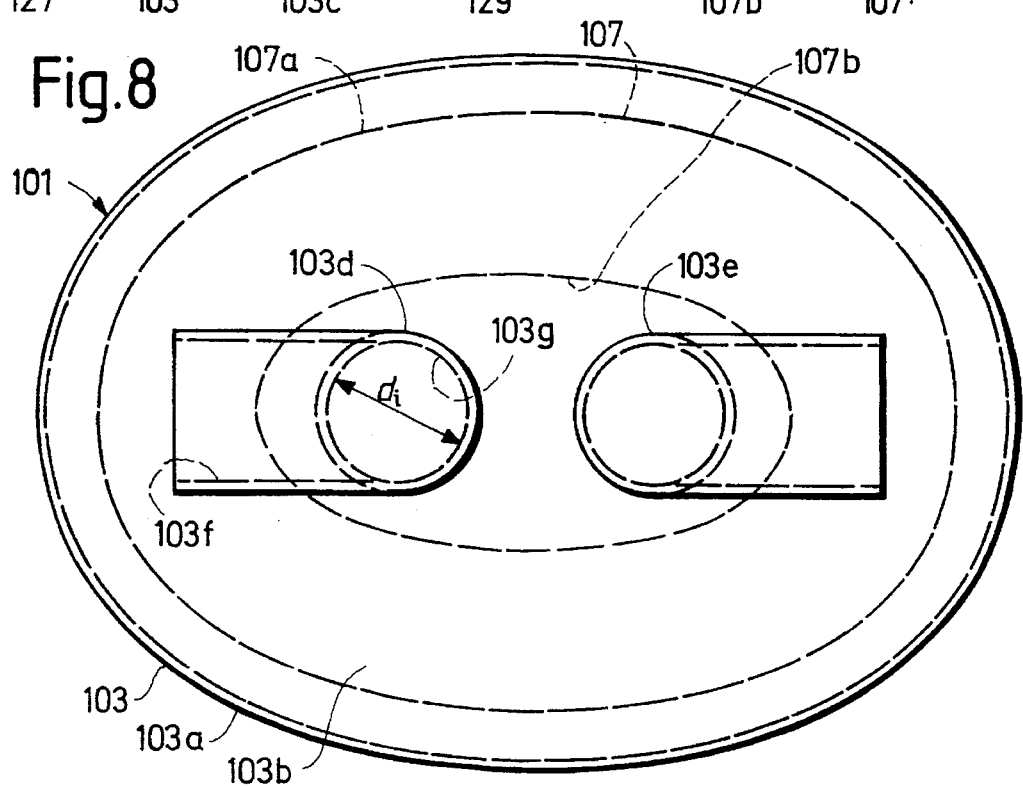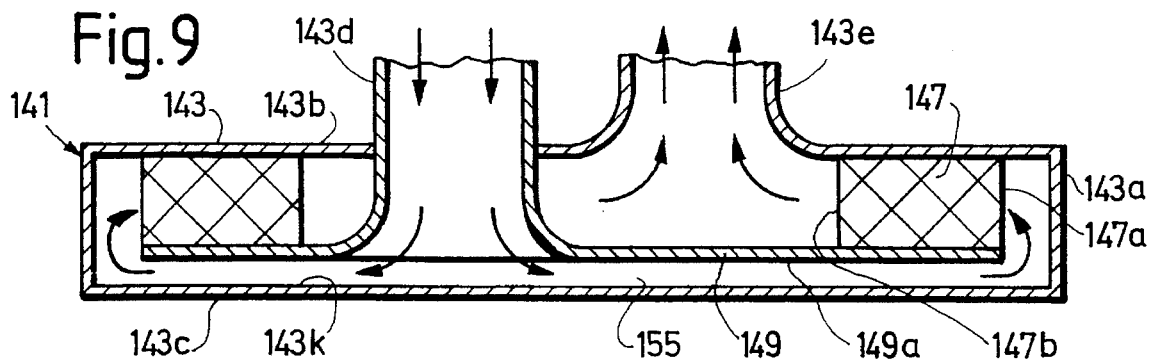

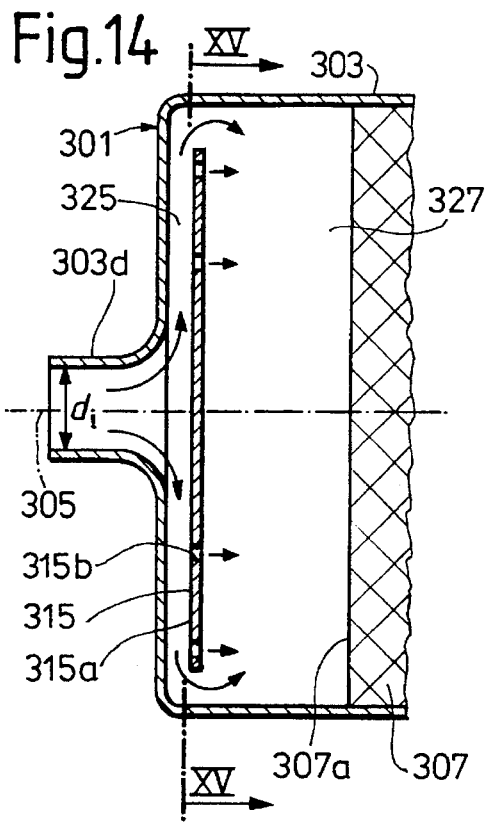
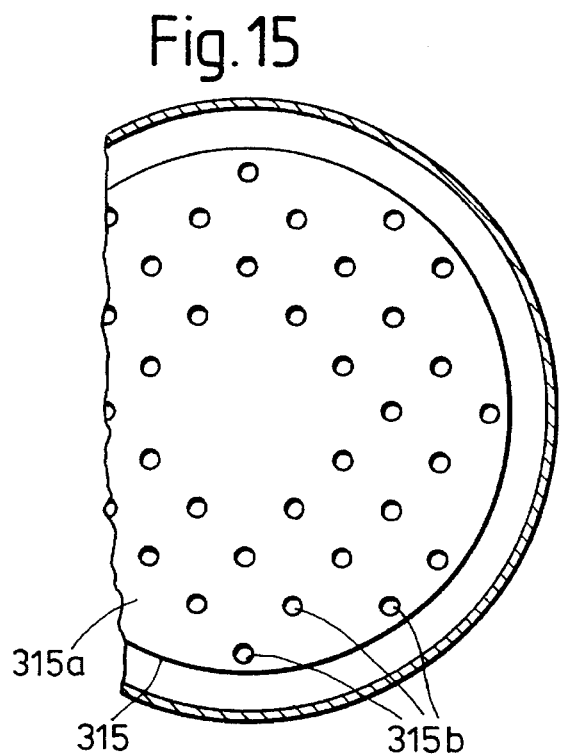
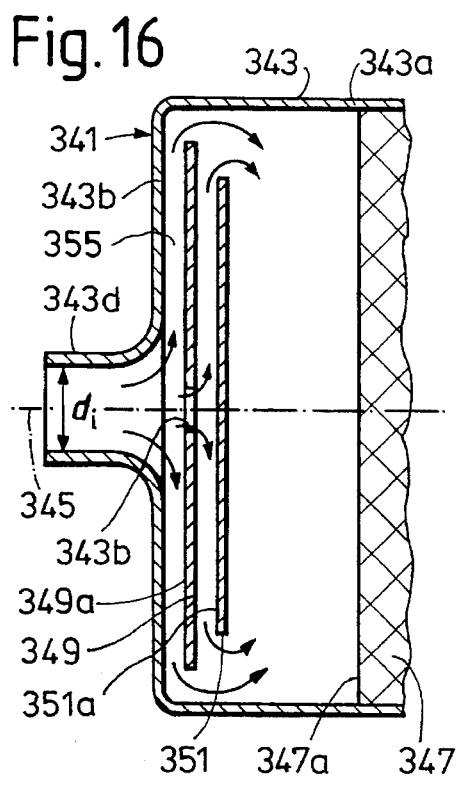
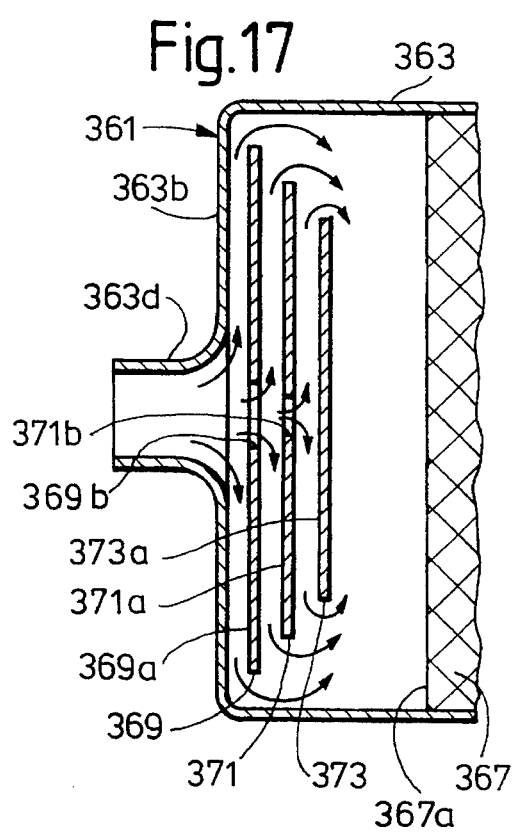

CATALYTIC CONVERTER FOR THE CATALYTIC TREATMENT OF EXHAUST GAS

This is a continuation of application Ser. No. 07/878,425, filed May 4, 1992, now abandoned.

BACKGROUND OF THE INVENTION

1. Field of the Invention

The invention relates to a catalytic converter for the catalytic treatment of exhaust gas. The catalytic converter is provided in particular to purify and/or to detoxify exhaust gas from an internal combustion engine, for example from a petrol combustion engine, by a catalytic treatment, i.e. to free the exhaust gas from pollutants by converting the latter by a chemical reaction. The internal combustion engine may, for example, belong to an automobile or other motor vehicle or be used for stationary operation—for example for driving an emergency power generator.

2. Description of the Prior Art

Catalytic converters known in practice for the catalytic purification of exhaust gas of a petrol combustion engine of an automobile have a casing with a lateral wall approximately circular or elliptical or oval in cross-section and with two end walls which are each provided in the center with a cylindrical connection and widen more or less conically from this to the lateral wall. One connection serves as an inlet and the other as an outlet. A catalyst element which has a number of passages parallel to the longitudinal axis is arranged in the casing. The catalyst element frequently has a carrier which consists of ceramic or steel and is coated with a catalytically active material containing at least one noble metal.

During operation of the known catalytic converter of the types described above, the exhaust gas fed to a catalytic converter flows, after passing the opening of the cylindrical inlet, into a cavity which is present between this inlet and the catalyst element and which is defined by the more or less conically widening end wall and possibly also by a short section of the lateral wall forming a circular or elliptical or oval cylinder. In this cavity, the exhaust gas forms approximately a jet which is directed at that end face of the catalyst element which faces the inlet. Introduction of the exhaust gas into the catalytic converter in this manner causes considerable turbulences and a large pressure loss. Furthermore, the jet mentioned results in the flow velocities and the flow rates in the catalyst element being inhomogeneous and being substantially greater in its central cross-sectional region aligned with the inlet opening than in the peripheral cross-sectional region. Since the flow path in the catalyst elements of the known catalytic converters is relatively long and furthermore a relatively large part of the exhaust gas flows at high velocity through the central cross-sectional region of the catalyst element, these likewise cause a large pressure loss in the known catalytic converters. The relatively large pressure loss produced between the inlet and the catalyst element and in the latter in the case of the known catalytic converters in turn results in a relatively large power loss of the internal combustion engine. In the case of catalyst elements having a volume corresponding approximately to the engine capacity, the total pressure loss due to the catalytic converter is, for example, of the order of 10 kPa, with the result that, for example, a power loss of about 2 kW to 3 kW can result in an internal combustion engine of an automobile of the medium power class.

The described inhomogeneity of the flow rate in the catalyst element furthermore has the disadvantage that the catalyst element is subjected to much greater stress in the central cross-sectional region than in the peripheral cross-sectional region. In order to achieve sufficient purification of the exhaust gas in spite of the inhomogeneous distribution of the flow over the cross-sectional area, the catalyst element must be provided with larger dimensions than would be necessary in the case of homogeneous flow distribution. As a result, the catalyst becomes much more expensive—in particular owing to the high price of the noble metal forming the catalytically active layer.

British Patent Disclosure 2 062 487 has already disclosed catalytic converters in which the exhaust gas is deflected between the orifice of the inlet and the exhaust air entry surface of the catalyst element. The casing of these catalytic converters has a cylindrical lateral wall and conical end walls which are adjacent to the ends of said side wall and taper away from said side wall. The inlet and the outlet of the casing each consist of a cylindrical pipe coaxial with the axis of the casing. A hollow cylindrical, gas-permeable catalyst element whose internal diameter is approximately equal to the external diameter of the pipe is arranged in the casing. In some of these catalytic converters, the pipe forming the inlet projects into the cavity enclosed by the annular catalyst element, is provided with holes in the region of this cavity and is closed by a terminating wall at that end surface of the catalyst element which faces the outlet. The exhaust gas flowing through the inlet into these catalytic converters during operation of said catalytic converters is backed up and deflected by the terminating wall and then flows into the catalyst element at the inner surface of said element. However, such backing up and deflection of the exhaust gas causes turbulences and a large pressure loss. In addition, a considerable axial pressure gradient, which in turn may cause a nonuniform distribution of the exhaust gas in the catalyst element, is produced in the cavity enclosed by the catalyst element. As already mentioned, a nonuniform distribution of the exhaust gas flowing through the catalyst element may increase the pressure losses produced in the catalyst element.

In the catalytic converter shown in the final Figure of British Patent Disclosure 2 062 487, the pipe forming the inlet enters the inner space of the casing at the thinner end of one of the conical end walls. An outer, annular cavity is present between the cylindrical lateral wall of the casing and the outer lateral surface of the annular catalyst element. In the inner space of the housing, a guide element is arranged on that end face of the catalyst element which faces the inlet. The guide element has a point projecting towards the orifice of the inlet and forms a conical guide surface which is inclined at 45° to the casing axis. The guide element deflects the exhaust gas flowing through the inlet into the inner space of the casing during use of the catalytic converter outwards into the outer cavity. However, the exhaust gas flowing at relatively high velocity from the inlet into the inner space of the housing may become detached from the wall of the casing at the edge forming the orifice edge of the inlet, so that the flow tends to form turbulences there which may cause a considerable pressure loss. The formation of turbulences and the pressure loss are furthermore reinforced by the point of the guide element. As already explained, the pressure losses or pressure gradients produced in the catalytic converter cause losses of performance in the internal combustion engine connected to the catalytic converter.

Since the conical end walls of the casings of the catalytic converters disclosed in British Patent Disclosure 2 062 487 make an angle of only 35° to 40° with the axis of the relevant casing, the casings are relatively long compared with the axial dimensions of the catalyst elements. This may be disadvantageous in particular in the case of catalytic converters for installation in exhaust systems of automobiles or other motor vehicles, since there is often little space available there.

SUMMARY OF THE INVENTION

It is therefore the object of the invention to provide a catalyst which overcomes the disadvantages of the known catalytic converters and in particular causes only a small pressure loss for a certain, predetermined amount of exhaust gas to be treated per unit time and gives a homogeneous flow distribution in the catalyst element, and it should be possible to produce the latter with a small volume and economically.

This object is achieved according to the invention by the catalytic converter for the catalytic treatment of exhaust gas, in particular exhaust gas of an internal combustion engine, having a casing which is provided with an inlet entering the inner space of the housing at an orifice and having an axis, and an outlet, a gas-permeable element and a guide surface being present in the inner space, which guide surface is a distance away from the edge of the stated orifice in order to deflect exhaust gas flowing from the inlet into the inner space, wherein the inlet has an inner surface with a transition surface section extending in an arc-like manner towards the edge of the orifice in a section through the axis.

According to the invention, the inner surface of the inlet thus has a transition surface section which may also be designated as an orifice surface section and, in a section through the axis of the inlet, extends in an arc-like manner towards the edge of the orifice. The inner surface section thus extends also in the direction of the flow and along the flow path towards the inner space.

The edge of the orifice of the inlet can be bordered by the further end of the extending transition surface section or can be coordinated with the further end of the transition surface section so that the latter—in other words—extends exactly to the inlet orifice edge. Otherwise, the transition surface section should preferably extend in an arc-like manner in any section through the axis of the inlet. The transition surface section and that inner surface section of the inlet which is upstream of said transition surface section are preferably rotationally symmetric with the axis of the inlet.

The exhaust gas flowing during use of the catalytic converter from the orifice bordered by the inlet into the inner space of the casing can therefore be deflected by the guide surface opposite the orifice of the inlet without becoming detached from the transition surface section. The formation of turbulences can therefore be substantially or completely avoided.

In an advantageous embodiment of the catalytic converter according to the invention, the inner surface of the inlet has a circular cylindrical inner surface section or an inner surface section which extends slightly conically in the direction of flow, which inner surface section is continuously connected to a counter-surface a distance away from the guide surface. In a particularly advantageous embodiment of the catalytic converter according to the invention, the guide surface and the counter-surface are substantially flat and at right angles to the axis of the inlet.

The guide surface or at least the section thereof outside the inlet orifice edge in axial projection and that section of the counter-surface opposite said section can, however, also make an angle other than 90° with the axis of the inlet. These angles are then preferably at least 60° and, for example, at least 70° to, for example, about 85°. Furthermore, the two angles made by the stated sections of the guide surface and of the counter-surface with the inlet axis are preferably equal, so that the opposite sections of the guide surface and of the counter-surface are parallel to one another in the sections through the inlet axis.

A term will be explained here. As already described, pressure losses or pressure drops or—in other words— back pressures to be overcome are produced in the catalytic converter. It is known that a pressure loss produced in a flow can be expressed by a dimensionless ratio, a so-called pressure loss coefficient. This is designated below by Z and should be equal to the ratio of the pressure loss considered to the dynamic pressure of the exhaust gas flowing through the inlet of the catalytic converter. The dynamic pressure is given by the expression $rho \cdot v^2/2$, where rho designates the density and v designates the velocity of the exhaust gas flowing through the inlet.

As will be explained in the description of the illustrative Examples by means of a graph, it is possible to ensure that the pressure loss coefficient Z, which is a measure of the pressure loss produced during deflection of the exhaust gas, is less than 1 and preferably less than 0.6 or even less than 0.5 with suitable dimensioning of the radius of curvature of the transition surface section and of the distance of the guide surface from the inlet orifice edge and from the counter-surface.

BRIEF DESCRIPTION OF THE DRAWINGS

The subject of the invention is described below with reference to illustrative Examples shown in the drawings. In the drawings, FIG. 2A shows an exploded view of some disks of the catalyst element of the catalytic converter, FIGS. 5 to 7 show sections through other catalytic converters, FIG. 8 shows a plan view of the catalytic converter illustrated in FIG. 7, FIGS. 9 and 10 shows sections through further catalytic converters, FIG. 15 shows a cross-section through the catalytic converter shown in FIG. 14, along the line XV—XV of FIG. 14, and FIGS. 16 to 19 show axial sections through yet further catalytic converters.

DESCRIPTION OF THE PREFERRED EMBODIMENTS

Figure 1:
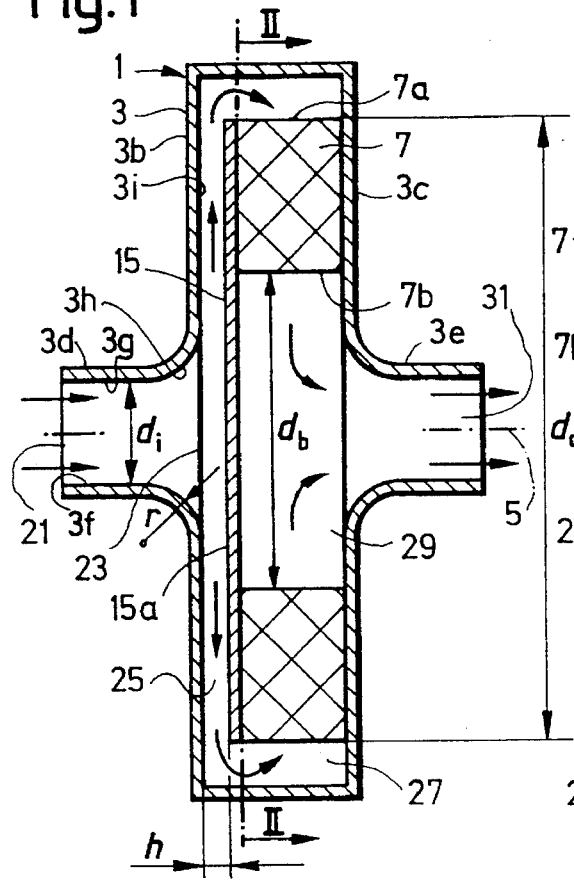
FIG. 1 shows a simplified axial section through a catalytic converter having a casing and a catalyst element which is arranged therein and which consists of a hollow cylindrical ring.
Figure 2:
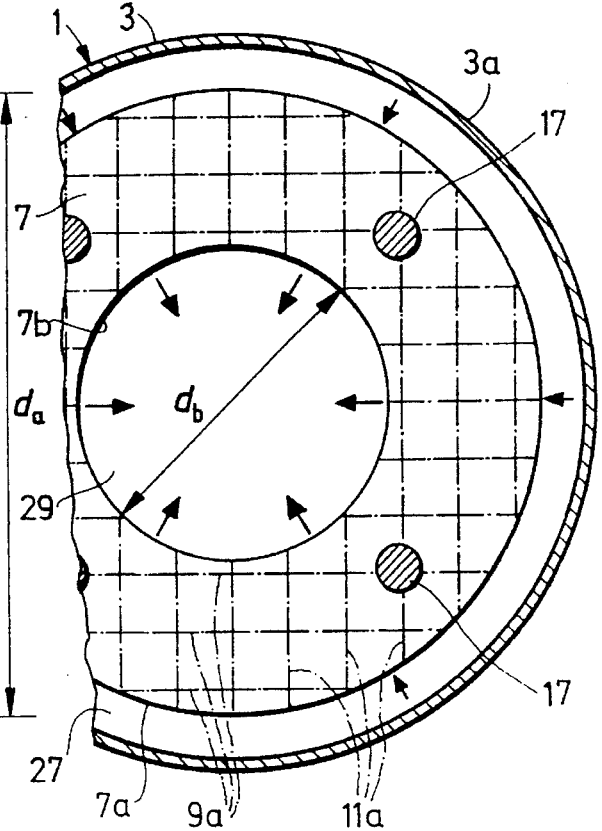
FIG. 2 shows a section along the line II—II of FIG. 1 through the catalytic converter shown therein.

The catalytic converter 1 shown in FIG. 1 and partly in FIG. 2 has a casing 3 with a metallic wall which consists, for example, of stainless steel and defines an inner space and seals the latter gas-tight from the environment. The wall of the casing 3 is in general rotationally symmetric with respect to an axis 5 and has a generally circular cylindrical lateral or annular wall 3a—i.e. a short slave or shell coaxial and parallel to the axis 5 and, at each of the two ends thereof, an end wall 3b, 3c which makes an angle—namely a right angle—with the axis 5 and is thus radial. Each end wall 3b, 3c is provided in the center with a connection which projects away from the end wall, is coaxial with the axis 5 and serves as inlet 3d or as outlet 3e. The inlet 3d has an inner surface 3f with a circular cylindrical inner surface section 3g. The latter is connected continuously, by a transition surface section 3h bent away from the axis 5 in axial section, to the right-angled, flat and smooth inner surface of the end wall 3b, which inner surface is radial with respect to the axis 5. This inner surface is designated below as counter-surface 3i. The inner surface of the outlet 3e is identical or similar to that of the inlet 3d. Otherwise, the casing shown schematically in FIG. 1 as a one-piece element actually consists of at least two parts tightly connected to one another, namely welded to one another.

Figure 3:
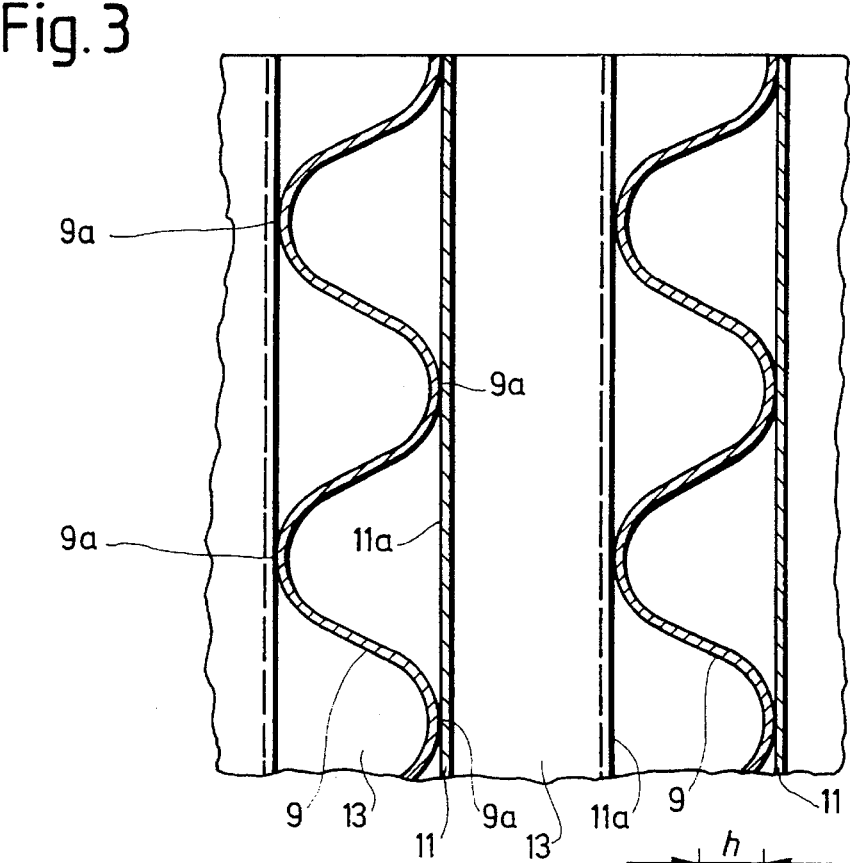
FIG. 3 shows a cut-out from the catalyst element cut in the same way as in FIG. 1, but on a larger scale.

A core which has an annular or sleeve-like, gas-permeable catalyst element 7 is arranged and fastened in the casing 3. Such a core is frequently referred to in technical language as a substrate. The catalyst element has an outer, circular cylindrical lateral surface 7a on the outside, an inner, circular cylindrical lateral surface 7b on the inside and a generally flat, radial end surface at both ends. The two lateral surfaces 7a, 7b are also designated below as exhaust gas entry surface 7a and exhaust gas exit surface 7b, respectively. The catalyst element 7 has a number of annular discs 9 and 11 which are arranged coaxially with one another and some of which are shown in FIGS 2A and 3, a disc 9 following a disc 11 in alternate order. Each disc is wavy in profile and/or cross-section and forms a number of waves parallel to one another. If it is imagined that a radial central plane at right angles to the axis of the element passes through a certain disc, the half-waves projecting away on the sides of this central plane which face one another may be considered as protuberances on the disc. In FIGS. 2, 2A and 3, the lines through the summits of the half-waves of disc 9 are designated by 9a and the lines through the summits of the half-waves of disc 11 are designated by 11a. It should be noted here that in reality there are substantially more lines through the summits of half-waves than shown in FIGS. 2 and 2A. The waves of various discs 9 are all parallel to one another. The waves of the different discs 11 are likewise parallel to one another and intersect the waves of the disc 9 at right angles in plan view parallel to the axis 5. Two discs 9, 11 adjacent to one another touch one another at the intersection points of their wave summits projecting towards one another and thus at a large number of approximately point-like contact locations regularly distributed over their surfaces. In the other surface regions not included by these point-like contact locations, a cavity is present between adjacent discs, which cavity forms a passage 13 of the catalyst element 7. The passages 13 are generally along radial planes at right angles to the axis 5 and permit the exhaust gas to be treated to flow from the outer lateral surface and/or exhaust gas entry surface 7a in more or less radial directions to the inner lateral surface and/or exhaust gas exit surface 7b. As already mentioned, the catalyst element 7 is thus gas-permeable, in general in radial directions. It should be noted that some of the exhaust gas flowing through the element 7 during operation more or less follows the wavy surfaces of the discs 9, 11 at certain points and of course also flows around the contact locations at which the discs are in contact with one another in pairs, so that the direction of flow of the exhaust gas in the element 7 is only generally, but not exactly, radial.

Each disc 9, 11 has a carrier which is formed by a corrugated metal sheet consisting of, for example, stainless steel. An alumina coating which serves to increase the surface area and in turn is coated with a layer of catalytically active material which contains at least one noble metal, for example platinum and/or rhodium, is applied to both sides of this carrier.

The thickness of the corrugated metal sheet forming the carrier may be, for example, 0.04 to 0.05 mm. The alumina layers applied to both sides of the carrier are, for example, thinner or have at most the same thicknesses as the carrier. The coatings consisting of the catalytically active material are thinner than the carrier and also thinner than the alumina layers. The wave height of a disc, measured from wave summit to wave summit may be, for example, about 1 to 1.5 mm.

The discs bordering the catalyst element on its two end faces may be, for example, flat and thicker than the discs 9, 11 or possibly also wavy. Otherwise, the discs arranged at the end faces of the element may alternatively be provided with coatings of alumina and noble metal only on its thinner faces or on both faces or on no face.

The formation of the catalyst element 7 from wavy discs 9, 11 makes it possible to achieve sufficient strength and high stability with relatively small disc thicknesses.

This in turn makes it possible for the total volume of the passages to be relatively large in relation to the volume of the total element and to be, for example, at least 60 or even at least 70% and up to 90% of the volume of the total element. Furthermore, the wavy profile of the discs gives large surface areas at the boundaries of the passages.

At its end face on the right in FIG. 1, the catalyst element 7 rests firmly and—if it does not likewise have a wavy surface on this end face—also at least to some extent or completely tightly against the end wall 3c. At its end face on the left in FIG. 1, is an end guide element 15 which consists of a flat, circular, for example metallic disc and whose diameter is the same as the external diameter of the catalyst element 7. That side of the guide element 15 which faces the end wall 3b of the casing 3 forms a flat, smooth guide surface 15a which is a distance away from the said wall and is at right angles to the axis 5 and therefore radial with respect to the said axis.

The various discs 9, 11 of the catalyst element 7 are preferably firmly connected to one another in some manner, for example sintered and/or moulded or soldered to one another at the contact locations or at least at some of these locations. The guide element 15 may likewise be welded or soldered to that disc of the element 7 which is adjacent to it. To fasten the core formed from the catalyst element 7 and the guide element 15 to the wall of the casing 3, for example, certain fastening elements 17 which are shown only in FIG. 2, consist of bolts and are distributed around the axis 5 and run parallel to these through the catalyst element 7 may be present. The fastening element 17 can, for example, be firmly welded to the guide element 15 and likewise firmly welded to the end wall 3c or may be detachably fastened with the aid of threaded nuts screwed onto its ends. The fastening elements may furthermore project as far as the end wall 3b and may likewise be nondetachably or detachably fastened thereto. That disc of the catalyst element 7 which is closest to the end wall 3c may furthermore be welded or soldered to the end wall 3c. The guide element 15 is compact, i.e. free from holes, apart from any holes possibly present and penetrated by the fastening elements 17.

The inlet 3d defines an inlet opening 21. The latter has an orifice which opens into the interior of the casing and has a flat orifice surface 23 which is present in the plane defined by the counter-surface 3i and is enclosed by-the counter-surface 3i. That region of the casing interior which is defined on one side by the guide surface 3a and on the opposite side by the counter-surface 3i, parallel to the guide surface, and the orifice surface 23 is designated below as deflection cavity 25. The latter connects the inlet opening 21 to the annular, outer cavity 27 present between the inner surface of the lateral wall 3a and the outer lateral surface 7a of the catalyst element and the edge of the guide element 15. In the interior of the element 7 is an inner, free cavity 29, one end of which is tightly sealed by the guide element 15 from the remaining inner space of the casing 3 and in particular from the deflection cavity 25. The inner cavity 29 communicates with the outlet opening 31 present in the outlet 3e.

The internal diameter of the inlet 3d is the same as the diameter of the circular cylindrical inner surface section 3g and of the narrow end of the transition surface section 3h, which end connects continuously with said inner surface section in the direction of flow of the exhaust gas. This diameter is designated below as internal diameter $d_i$ of the inlet. Furthermore, the cross-sectional area of the inlet opening is understood below as the cross-sectional area for the circular cylindrical inner surface section of the inlet. In the axial section shown in FIG. 1, the transition surface section 3h has the radius of curvature r. The guide surface 15a is a distance h away from the counter-surface 3i present opposite it, from the orifice surface 23 and thus in particular from the orifice edge delimiting the counter-surface from the orifice surface or—more precisely—the orifice surface edge. The external diameter of the catalyst element 7 and the equal diameter of the guide element 15 is designated by $d_a$. The internal diameter of the element 7, i.e. The diameter of the inner cavity 29, is designated by $d_b$.

As already mentioned, the fastening elements 17 can possibly extend as far as the end wall 3b and accordingly penetrate the deflection cavity 25. If this is the case, the deflection cavity is not completely but essentially free. If, on the other hand, the fastening elements 17 extend only from the end wall 3c to the guide element 15, the cavity 25 can be completely free. The outer cavity 27 may enclose the element 7 continuously and completely and may be completely free. However, it should be noted that, at its outer lateral surface 7a, the element 7 may be held on, for example supported and/or rigidly fastened to, the lateral wall 3a of the casing 3 by holding means which are not shown—for example by projections and/or ribs projecting radially outwards. If such holding means are provided, the outer cavity 27 is then likewise only partially free and under certain circumstances is even divided by the holding means into compartments, all of which however should be connected to the inlet opening 21 by the deflection cavity 25. It should furthermore be noted that the metallic wall of the casing may be provided on the inside and/or outside with heat insulation, which is not shown.

For its use, the catalytic converter 1 can be installed in an exhaust system of a petrol combustion engine of an automobile. The inlet 3d and the outlet 3e flush therewith may be connected by pipes which have approximately the same internal diameters as the inlet opening and the outlet opening. During operation of the engine and of the catalytic converter 1, the exhaust gas then flows, in the manner illustrated by arrows in FIGS. 1 and 2, through the catalytic converter 1. The exhaust gas in fact flows approximately parallel to the axis 5 of the inlet opening 21 and is then deflected by the guide surface 15a so that it flows in more or less radial directions away from the axis 5 through the deflection cavity 25 outwards to a border section of the deflection cavity 25 adjacent to the edge of the guide element 15. There, the exhaust gas is again deflected in a generally axial direction so that it flows into the outer cavity 27. From there, it enters the catalyst element 7 at the outer lateral surface and/or exhaust gas entry surface 7a, and it is distributed over the various passages 13 from this. The two cavities 25 and 27 thus together form a diffuser chamber for the exhaust gas. The exhaust gas distributed over the various passages 13 now flows through these in general in a radial direction inwards, the exhaust gas being purified and/or detoxified by a catalytic treatment. In the catalytic treatment, for example, carbon monoxide and hydrocarbons are oxidised, namely undergo combustion, in a known manner and oxides of nitrogen are reduced, namely converted into nitrogen and oxygen. The exhaust gas flowing out of the various passages 13 into the inner cavity 29 serving as a collecting chamber is collected therein, deflected in the axial direction and guided to the outlet opening 31, through which it leaves the catalytic converter 1.

Figure 4:
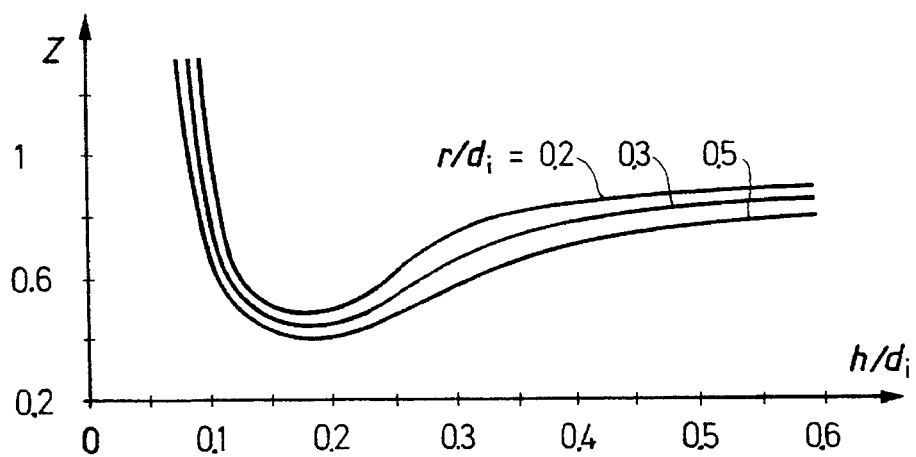
FIG. 4 is a diagram illustrating the pressure loss as a function of different dimensional ratios.

After this general description of the flow path of the exhaust gas, it is now intended to discuss a few details. If the exhaust gas flows from the inlet into the actual inner space of the casing 3, and is deflected by the guide surface 15a and passes the deflection cavity 25, a pressure loss results. This is dependent on the ratio $h/d_i$ and also on the ratio $r/d_i$. In the graph shown in FIG. 4, $h/d_i$ is plotted along the abscissa and the pressure loss coefficient Z for the pressure loss resulting on deflection of the exhaust gas in the deflection cavity, which coefficient is defined in the introduction, is plotted along the ordinate. The graph contains three curves, which are coordinated with the ratio $r/d_i$ of 0.2 and 0.3 and 0.5. According to the graph, the coefficient Z is greater than 1 for small values of the ratio $h/d_i$ of less than about 0.1, and the pressure loss is accordingly greater than the dynamic pressure of the exhaust gas flowing through the inlet. As the ratio $h/d_i$ increases, the pressure loss coefficient Z then initially decreases sharply but has a minimum at values of the ratio $h/d_i$ which are between 0.15 and 0.2 and then increases slowly again. According to the three curves of the graph, increasing the ratio $r/d_i$ from 0.2 to 0.5 results in a reduction in the pressure loss coefficient, the minimum value of Z being dependent on $r/d_i$ and being about 0.4 to 0.5.

The distance h is therefore preferably about 10% and more preferably, for example, at least 15% of the internal diameter $d_i$. The distance h is furthermore preferably not more than 25% of $d_i$ but can if necessary—as will be explained below—also be greater and may be, for example, up to at most 50% or at most 70% or even up to at most 100% of $d_i$. The radius of curvature r may be at least 10% or at least 20% and—if space permits—more preferably up to about 50% of the internal diameter $d_i$ or may perhaps even be made larger and up to, for example, 100% of $d_i$. In the case of such dimensions of h and r, according to the graph the pressure loss coefficient Z is not more than about 1 and even only about 0.4 to 0.5.

The diameter of the guide element 15 and the external diameter $d_a$ of the catalyst element 7, which is identical to this diameter, should be greater than the sum $d_i+2r$ and is preferably at least three times or at least four times and, for example, even at least or about five times greater than the internal diameter $d_i$. The edge of the guide surface 15a is thus a distance from the axis 5 which is preferably at least 1.5 times or at least twice or even at least or about 2.5 times $d_i$. The internal diameter of the lateral wall 3a is preferably larger than the external diameter $d_a$ of the catalyst element 7 by an amount such that the cross-sectional area of the outer cavity 27 in a cross-section at right angles to the axis 5 is at least three times, preferably at least five times or even at least or about ten times greater than the cross-sectional area of the inlet opening. The flow velocity of the exhaust gas in the outer cavity 27 is then substantially smaller than the flow velocity in the inlet opening 21 and in the pipe section usually connected to the inlet 3d. This ensures that the pressure loss produced in the outer cavity 27 only slightly increases the pressure loss resulting in the deflection cavity 25, but the pressure in the entire outer cavity 27 is virtually constant and that the exhaust gas is uniformly distributed over all passages 13 of the catalyst element 7.

The internal diameter $d_b$ of the catalyst element 7 is greater than the internal diameter $d_i$ of the inlet, preferably at least equal to the sum $d_i+2r$ and, for example, at least 50% and preferably 100% greater than $d_i$. Since the exhaust gas flows through the catalyst element 7 at least in general in radial directions, the cross-sectional area of the element 7 along the flow path, which area is at right angles to the direction of flow, varies between the size of the outer lateral surfaces and/or exhaust gas entry surface 7a and the size of the inner lateral surface and/or exhaust gas exit surface 7b of the element 7. The sizes of the two lateral surfaces 7a, 7b are determined by the diameters $d_a$ and $d_b$, respectively, and the axial dimension of the element 7. The outer lateral surface of the element 7 is preferably at least five times and, for example, at least ten times or at least twenty times larger than the cross-sectional area of the inlet opening 21 and than the cross-sectional area of the outlet opening 31. The inner lateral surface of the element 7 is preferably at least three times, preferably at least five times or even at least ten times greater than the cross-sectional area of the inlet opening 21 and of the outlet opening 31.

If, for example, the element 7, with regard to the internal diameter $d_i$, has approximately the dimensions shown in FIGS. 1 and 2 and in fact the external diameter $d_a$ of the element 7 is about six times and the internal diameter $d_b$ of the element about three times the internal diameter $d_i$ and in addition the axial dimension of the element 7 is approximately equal to the internal diameter $d_i$, the outer lateral surface of the element 7 will be about 24 times and the inner lateral surface of the element about 12 times greater than the cross-sectional area of the opening 21. When the element 7 has such dimensions, the ratio of the cross-sectional area of the element 7 transverse to the radial directions of flow to the cross-sectional area of the inlet opening 21 is thus, at least in the largest part of the element 7, greater than the ratio of the cross-sectional area of the catalyst element to the cross-sectional area of the inlet opening of the catalytic converter, which ratio according to the introduction is typically about five to fifteen in the case of known catalytic converters having a catalyst element in which the direction of flow is axial. As already stated, the volume of the passages 13 of the catalyst element 7 may be, for example, 70% to about 90% of the total volume of the catalyst element 7, so that the volume fraction of the passages 13 is thus relatively large, based on the total volume of the catalyst element 7. As also already stated, the exhaust gas is uniformly distributed over all passages 13 of the catalyst element 7. For these reasons, in the case of a catalytic converter according to the invention and having the proportions shown in FIG. 1, the flow velocity of the exhaust gas and the catalyst element can therefore be considerably smaller than in the case of known catalytic converters having catalyst elements with an axial direction of flow.

In the case of a catalytic converter according to the invention, of the type described with reference to FIGS. 1 to 3, both the pressure loss resulting when the exhaust gas flows out of the inlet into the deflection cavity and the pressure loss resulting between the orifice of the inlet opening and the exhaust gas entry surface 7a of the catalyst element 7 can therefore be relatively small and in particular smaller than in the case of the known catalytic converters. Furthermore, the pressure loss produced in the catalyst element 7 can also be relatively small. For the same amounts of exhaust gas per unit time and with about the same volume of the catalyst element, the total pressure loss produced by the catalytic converter can be reduced, for example, by about 20% to 70% compared with the pressure loss caused by catalytic converters known in practice and having an element with an axial direction of flow.

The uniform distribution of the exhaust gas over the various passages 13 results in the flow rate and the flow density—i.e. The product of density and flow velocity—at the outer lateral surface of the element being approximately equal in all passages. The flow density is greater in an inward direction along the radial flow path but is constant over the entire cross-sectional area for each circular cylindrical cross-sectional area transverse to the direction of flow through the element 7. Such homogeneous flow through the element 7 results in optimal utilisation of the catalytically active material of the catalyst element and thus, for a given amount of the exhaust gas to be treated, makes it possible for the volume of the catalyst element to be smaller than in the case of a known catalytic converter having an element with an axial direction of flow. Consequently, the amount of catalytically active material required, i.e. of noble metal, can then also be reduced, so that a catalytic converter according to the invention can also be produced more economically than the known catalytic converter having a catalyst element with a direction of flow parallel to the axis.

Figure 5:
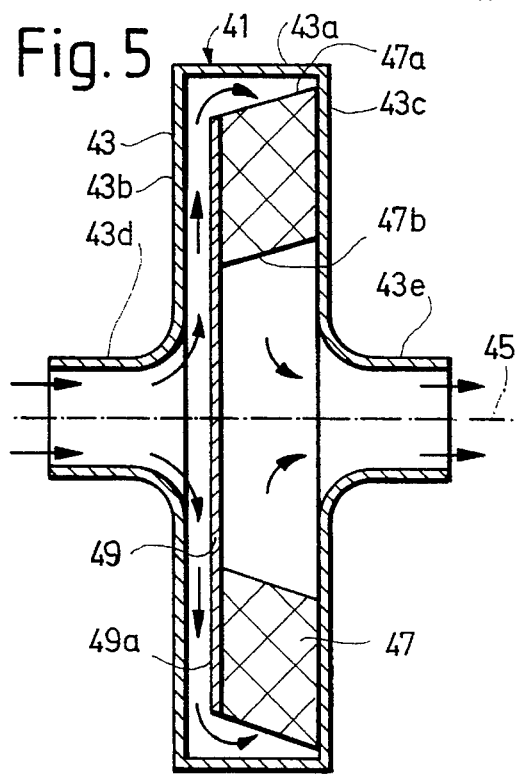

The catalytic converter 41 shown in FIG. 5 has a casing 43 which is identical or similar to the casing 3 and a cylindrical lateral wall 43a, two end walls 43b, 43c and two connections which serve as inlet 43d and outlet 43e, respectively. A catalyst element 47 is arranged in the inner space of the casing 43, the casing 43 and the element 47 having a common axis 45 and being at least in general rotationally symmetric with the axis. The element 47 is annular and has an outer lateral surface and/or exhaust gas entry surface 47a and an inner lateral surface and/or exhaust gas exit surface 47b. The two lateral surfaces 47a, 47b are inclined conically outwards in the direction from the inlet 43d to the outlet 43e, both lateral surfaces making the same angle with the axis 45. A guide element 49 which consists of a flat disc, has a flat guide surface 49a and possesses a conical edge having a smooth junction with the latter surface 47a is arranged at that end surface of the element 47 which faces the inlet. Otherwise, the catalytic converter 41 is identical or similar to the catalytic converter 1 and also has similar properties to this.

The catalytic converter 61 shown in FIG. 6 once again has a casing 63 which in general is rotationally symmetric with an axis 65 and is formed similarly to the casing 3 and has a cylindrical lateral wall 63a, two end walls 63b, 63c, an inlet 63d, an outlet 63e and a counter-surface 63i formed by the inner surface of the end wall 63b. The casing 63 forms a core which, in this variant of the catalytic converter, has two annular catalyst elements, namely a first catalyst element 67 and a second catalyst element 69. The two catalyst elements 67, 69 each have an outer, cylindrical lateral surface 67a or 69a, respectively, inner, cylindrical surface 67b or 69b, respectively, and two flat end surfaces. Otherwise, the two catalyst elements 67, 69 have passages so that the elements 67, 69 are gas-permeable in generally radial directions, analogously to the catalyst element 7. A first element 67 rests with one of its end surfaces against the end wall 63b. That end surface of the second element 69 which faces away from the element 67 rests against the end wall 63c. A guide element 75 which consists of a flat, circular, compact disc is arranged between the end surfaces of the two annular elements 67, 69, which end surfaces face one another. The middle region of that surface of the guide element 75 which faces the end wall 63b, which region is located in axial projection inside the annular element 67, serves as guide surface 75a. The two elements 67, 69 are connected firmly and, for example, at least to some extent or completely tightly to the end walls 63b, 63c and to the guide element 75.

The two annular catalyst elements 67, 69 have, for example, the same external diameter $d_a$, so that their outer lateral surfaces 67a and 69a and also the edge of the guide element 75 are flush with one another. The internal diameter $d_c$ of the first element 67 is larger than the sum $d_i + 2r$, $d_i$ and $r$ having the same meaning as in the case of catalytic converter 1. Furthermore, the internal diameter $d_c$ of the first element 67 is, for example, larger than the internal diameter of the second element 69, which internal diameter is designated, as the one of element 7 of catalytic converter 1, by $d_b$. The diameter $d_c$ is preferably at least three times or preferably at least four times or possibly at least even five times greater than the inlet internal diameter $d_i$. Accordingly, the edge of the guide surface 75a, which edge likewise has the diameter $d_c$, is a distance away from the axis 65 which is preferably at least 1.5 times or preferably at least twice or possibly at least 2.5 times the inlet internal diameter $d_i$. In addition, the first element 67 has, for example, a smaller axial dimension than the second element 69. Accordingly, the first element 67 has a substantially smaller volume than the second element 69.

The inlet 63d defines an inlet opening 81 which enters the deflection cavity 85 at the orifice surface 83, the deflection cavity being bounded on one side by the guide surface 75a and on the side opposite this by the counter-surface 63i and by the orifice surface 83. The deflection cavity 85 furthermore forms an inlet cavity enclosed by the inner lateral surface 67b of the first element 67. The continuous outer cavity 87 extending over both outer lateral surfaces 67a, 69a is present between the lateral wall 63a of the casing and the two elements 67 and 69 and the guide element 75. The inlet cavity 89 enclosed by the second element 69 is separated in a gas-tight manner by the guide element 75—apart from the connection via the passages of the two catalyst elements 67, 69. The cavity 89 furthermore communicates with the outlet opening 91 bounded by the outlet 63e.

Figure 6:
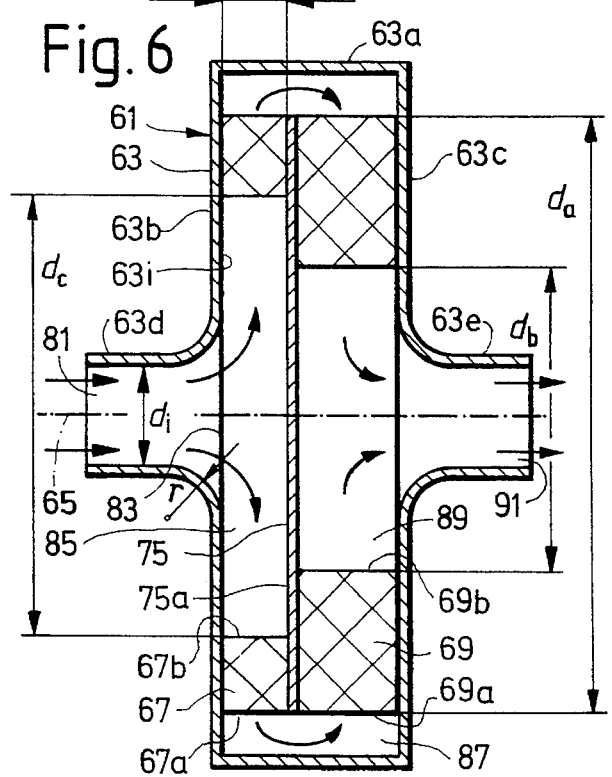

During operation of the catalytic converter 61, the exhaust gas flows, according to the arrows shown in FIG. 6, through the inlet opening 81 into the deflection cavity 85 and is deflected radially outward therein toward a border section of the deflection cavity adjacent to the inner lateral surface 67d of the first catalyst element 67. Thereafter, the exhaust gas enters the first element 67 at the inner lateral surface 67d and flows radially through said element into the outer cavity 87. In this, the exhaust gas flows toward the outer lateral surface 69a of the second element 69. The exhaust gas then flows through this radially inward through the inner cavity 89 and finally through the outlet opening 91 and out of the casing 63.

In the catalytic converter 61, the inner lateral surface 67b of the first element 67 and the outer lateral surface 69a of the second element 69 thus serve as exhaust gas entry surfaces 67b and 69a, respectively. Furthermore, the outer lateral surface 67a and the inner lateral surface 69b serve as exhaust gas exit surfaces 67a and 69b, respectively. The distance h of the guide surface 75a from the counter-surface 63i and from the orifice surface 83 in the catalytic converter 61 is the same as the axial dimension of the first catalyst element 67. To ensure that this axial dimension is sufficiently large, the ratio $h/d_i$ can be made slightly larger than the value at which the pressure loss coefficient Z has a minimum. However, the ratio $h/d_i$ can, for example, be even smaller than 1 and be, for example, at most or about 0.7. The pressure loss coefficient Z resulting from the deflection of the exhaust gas in the deflection cavity 85 is then always smaller than 1, and the pressure loss is correspondingly smaller than the dynamic pressure of the exhaust gas flowing through the inlet opening 81. The distance h may even be only at most 50% or even only at most 25% of the internal diameter $d_i$, so that the value of the ratio $h/d_i$ is at least approximately at the minimum of the curves shown in FIG. 4, as in the case of catalytic converter 1. In addition, the exhaust gas is uniformly distributed over the passages of the catalyst elements 67, 69 on flowing into said elements. Since the exhaust gas first flows into the element 67 after flowing into the casing 63, and since said element has a relatively small volume, the first catalyst element 67 is rapidly heated to the temperature required for triggering the desired chemical reactions on starting an internal combustion engine connected to the catalytic converter 61. The first catalyst element 67 accordingly serves in particular as a starting catalyst element in order rapidly to trigger the catalytic treatment of the exhaust gas in the start phase. If both catalyst elements 67, 69 have the temperature required for the catalytic treatment after the start phase, the catalytic treatment then takes place for the major part in the second catalyst element 69 which has a larger volume and thus serves as the main catalyst element. In addition, the catalytic converter 61 has similar properties to the catalytic converter 1.

The catalytic converter 101 shown in FIGS. 7 and 8 has a casing 103. The latter has a lateral wall 103a having the shape of a short, approximately oval or elliptical cylinder, two flat end walls 103b and 103c, an inlet 103d and an outlet 103e. The inlet and the outlet each have a curved connection—i.e. a pipe bend—with a section which projects away at right angles on the end wall 103b and, for example, vertically upward according to FIG. 7 and which is connected via a bend to a free end section parallel to the end wall 103b. The sections of the inlet and of the outlet which project away from the end wall 103b, for example in the plan view shown in FIG. 8, have mirror symmetry with respect to a plane through the shorter axis of the oval or of the ellipse formed by the lateral surface 103. The bent inlet 103d defines the axis 105, of which only the section at right angles to the end wall 103b is shown in FIG. 7. The free end sections of the inlet 103d and of the outlet 103e are, for example, flush with one another and have axes and openings facing away from one another. The circular cylindrical section at right angles to the end wall is connected to the end wall 103b via a widening transition section. The inner surface 103f of the inlet accordingly has, inter alia, a rotationally symmetrical, inner surface section 103g parallel to the shown section of the axis 105 and transition surface section 103h which is bent outward in a section along the axis 105 and continuously connects the section 103g with the inner surface of the end wall 103b, which inner surface serves as counter-surface 103i.

An annular catalyst element 107 which is fastened and arranged in the casing has an outer lateral surface 107a and/or exhaust gas entry surface 107a having an oval or elliptical contour and an inner lateral surface 107b and/or exhaust gas exit surface 107b which, for example, is likewise oval or elliptical and parallel to the surface 107a. The catalyst element 107 has passages which are generally parallel to the end wall 103b, 103c and lead from its outer lateral surface and/or its exhaust gas entry surface 107a to its inner lateral surface and/or exhaust gas exit surface 107b and is formed, for example, analogously to the catalyst element 107 from wavy discs. The catalyst element 107 is pressed firmly and at least to some extent tightly against the end wall 103c and is connected, at its end face facing away from said end wall, to a guide element 115 which consists of a disc and whose side facing the end wall 103b forms a flat guide surface 115a. The outlet 103e is inserted through a hole present in the end wall 103b tightly into the inner space of the casing 103 and is tightly connected to the guide element 115 at a hole in said element—for example via a transition section widening outward in an arc-like manner—the last-mentioned hole being present in the region enclosed by the inner lateral surface 107b in the plan view shown in FIG. 8.

The inlet opening 121 bordered by the inlet 103 enters the deflection cavity 125 present between the guide surface 115a and the counter-surface 103i opposite this guide surface at the orifice surface 123, said deflection cavity communicating with the outer cavity present between the lateral wall 103a and the outer lateral surface 107a. The inner cavity 129 enclosed by the inner lateral surface 107b communicates with the outlet opening 131 bordered by the outlet 103e.

The ratio of the distance h between the guide surface 115a and the counter-surface 103i to the inlet internal diameter $d_i$ may have, for example, approximately the same magnitude as in the case of catalytic converter 1. In the case of catalytic converter 101, the distance from the edge of the guide surface 115a to the axis 105 of the inlet 103d differs for the different edge points. That point of the edge of the guide surface 115a which is closest to the inlet axis 105 has a distance from the axis 105 which is preferably at least 1.5 times, possibly at least twice or even at least 2.5 times the internal diameter $d_i$ of the inlet.

While the catalytic converters 1, 41, 61 can be installed, for example, with axes 5 or 45 or 65, respectively, parallel to the driving direction of an automobile in the exhaust system of an automobile, catalytic converter 101 can be installed, for example, in such a manner in an exhaust system on an automobile that the cylindrical inner surface section 103g of the inlet and that section of the axis 105 belonging to this inner surface section are at right angles to the driving direction and approximately vertical. Otherwise, the catalytic converter 101 has similar properties to the catalytic converter 1.

The catalytic converter 141 shown in FIG. 9 has a casing 143 with a lateral wall 143a, two end walls 143b, 143c, an inlet 143d and an outlet 143e. An annular catalyst element 147 having an outer lateral surface 147a and an inner lateral surface 147b is arranged in the casing. The lateral wall 143a of the casing 143 and the catalyst element 147 have, for example, the same or similar contours as the corresponding parts of the catalytic converter 101. Furthermore, those parts of the inlet 143d and of the outlet 143e which are located above the end wall 143b in FIG. 9 and are only partly shown may also have a form similar to that in the catalytic converter 101. However, the catalytic converter 141 differs from the catalytic converter 101 in that the guide surface 143k is formed by the inner surface of the end wall 143c and that the element 147 rests against the end wall 143b. Furthermore, the terminating element 149 which consists of a disc and whose side facing the guide surface 143k forms a flat counter-surface 149a a distance away from the guide surface 143k is fastened to that end face of the catalyst element 147 which faces away from the end wall 143b. In addition, the inlet 143d enters the inner space of the casing 143 with a tight seal through a hole in the end wall 143d, projects through the space enclosed by the inner lateral surface 147b of the catalyst element 147 and is connected tightly thereto at a hole present in the terminating element 149. In a catalytic converter 141, the deflection cavity 145 is accordingly present between the end wall 143c and the terminating element 149. Otherwise, the catalytic converter 141 can be installed in a similar manner to the catalytic converter 101.

During operation of the catalytic converter 141, the exhaust gas flows from the inlet into the deflection cavity 105 and then around the edge of the counter-surface 149a. The edge of the counter-surface 194a may be—in comparison with the internal diameter of the inlet—approximately the same minimum distance from the axis as in the case of catalytic converter 101.

Figure 10:
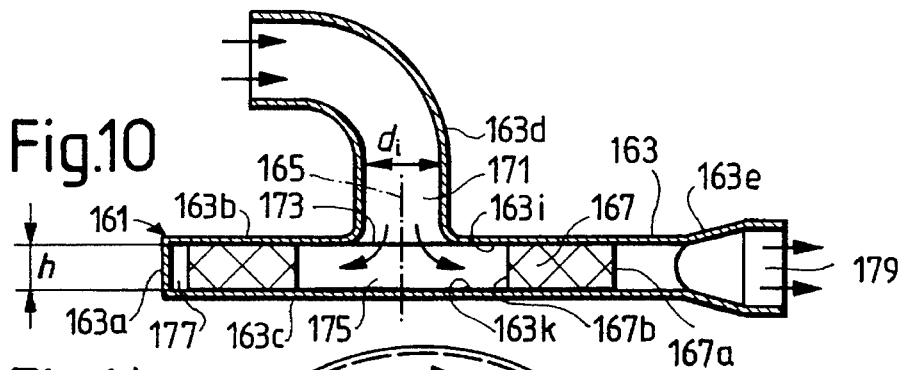
Figure 11:
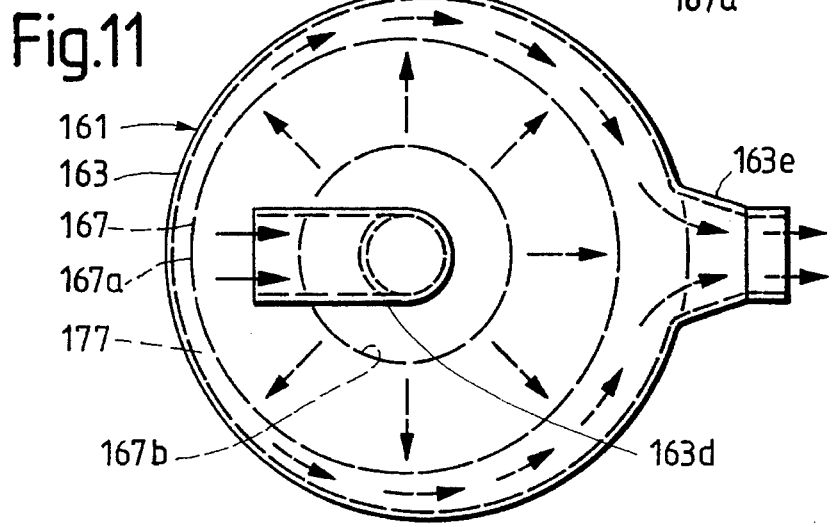
FIG. 11 shows a plan view of the catalytic converter according to FIG. 10, FIGS. 12, 13 and 14 show axial sections through other catalytic converters.

The catalytic converter 161 shown in FIGS. 10 and 11 has a casing 163 whose lateral wall 163a forms a hollow circular cylinder or a hollow cylinder having a contour deviating slightly on a circle, for example an approximately elliptical or oval and possibly a slightly asymmetric contour. The casing has a flat end wall 163b or 163c at each of the two ends of the lateral wall 163a. The end wall 163b is provided with a slightly eccentrically arranged pipe bend which projects away from said end wall, is bent toward its free end and forms an inlet 163d. Its cylindrical section closer to the end wall 163b is coaxial with a section, at right angles to the end wall 163b, of the axis 165 of the inlet and is continuously connected to the end wall 163b via a transition section which is extended in an arc-like manner in a section along the axis 165. The lateral wall 163a is provided, at its peripheral point furthest away from the inlet 163d, with an outward-projection connection as outlet 163e. An annular catalyst element 167 which, for example, is coaxial with the axis 165 is arranged in the casing 163. The element 167 has an outer, circular cylindrical lateral surface 167a, an inner, circular cylindrical lateral surface 167b and two generally flat end surfaces and is connected firmly and tightly to the end walls 163b and 163c at said end surfaces. The element 167 is furthermore provided with generally radial passages. In this variant of the catalytic converter, the guide surface 163k is formed by that region of the inner surface of the end wall 163c which is enclosed by an annular element 167 in a projection at right angles to the end walls. The counter-surface 163i is formed by the region of the inner surface of the end wall 163b which is enclosed by the element 167 in the said projection.

The inlet 163d borders an inlet opening 171 which enters the deflection cavity 173 and/or inner cavity 175 present between the guide surface 163k and the counter-surface 163i and enclosed by the inner lateral surface 167b, at the orifice surface 173. Between the lateral wall 163a of the casing 163 and the outer lateral surface 167a of the element 167 is an outer cavity 177 which communicates with the outlet opening 179 bordered by the outlet. As can be seen from FIG. 11, the dimension of the outer cavity 175, measured radially to the axis 165, has a minimum at the peripheral point diagonally opposite the outlet 163e and increases continuously from this peripheral point along the circumference in both directions to the outlet 163e.

The free end sections of the inlet 163d and of the outlet 163e of the catalyst 161 project away from one another, those sections of the axes of the inlet or of the outlet belonging to it being parallel to one another but displaced with respect to one another. The catalytic converter 161 can be installed in the exhaust system of an automobile, for example, in such a way that the end wall 163b, 163c and the free end sections of the inlet and of the outlet are parallel to the direction of driving. The internal diameter $d_i$ of the circular cylindrical inlet section projecting away from the end wall 163b and the distance h of the guide surface 163k from the counter-surface 163i and the orifice surface 173 are also shown in FIG. 10.

In the catalytic converter 161—as in catalytic converter 61—the ratio $h/d_i$ is perhaps larger than the optimal value but may be less than 1 and, for example, at most or approximately 0.7.

During operation of the catalytic converter 161, the exhaust gas flows through the catalytic converter 161 in the manner indicated by arrows in FIGS. 10 and 11. In fact, the exhaust gas passes through the inlet opening 171 and into the deflection cavity 175, is deflected therein by the guide surface 163k in a direction generally radial with respect to the axis 165, then flows through the passages of the element 167 and then enters the outer cavity 177. The exhaust gas flowing out of the passages is collected therein, at least the major part of the exhaust gas flowing along a peripheral section of the outer lateral surface 167a of the element 167 until it reaches the outlet 179 and flows out through this. The catalytic converter 161 furthermore has similar operating properties to the catalytic converter 1 and to the other catalytic converters described with reference to the drawings.

Figure 12:
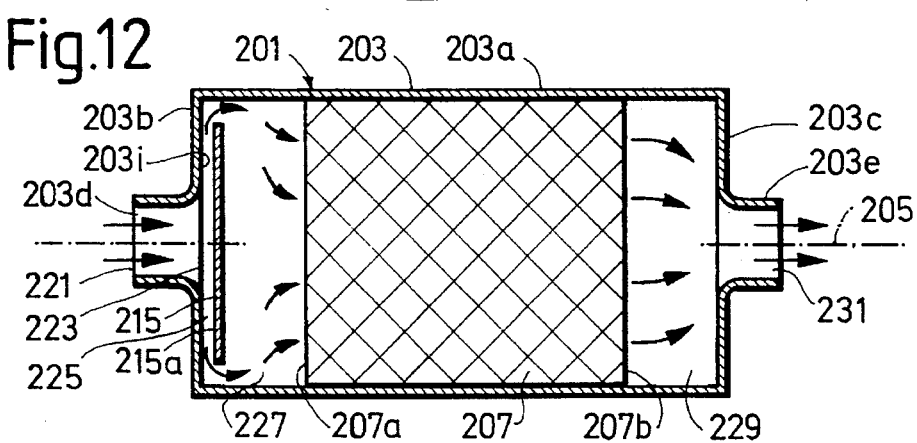

The catalytic converter 201 shown in FIG. 12 has a casing 203 with an axis 205. The lateral wall 203a of the casing 201 is, for example, cylindrical and rotationally symmetric with respect to the axis 205. The casing 203 has two radial end walls 203b, 203c at right angles to the axis of 205, one of which is provided with an inlet 203d and the other with an outlet 203e. As in the catalytic converter 1, the inlet and the outlet each consist of a connection having a circular cylindrical inner surface section which is connected continuously to the inner surfaces of the end walls 203b and 203c via a transition surface section extending in an arc-like manner in axial section. The inner surface of the end wall 203b forms a counter-surface 203i.

The catalytic converter 201 has a cylindrical catalyst element 207 which is fastened in the casing 203 and whose lateral surface is tightly connected to the lateral wall 203a of the casing. The element 207 is gas-permeable in the generally axial direction and has a flat end surface and/or exhaust gas entry surface 207a at its end facing the inlet and a flat end surface and/or exhaust gas exit surface 207b at its other end. The element 207 may have, for example, a ceramic or metallic carrier of known type having axial passages whose boundaries are coated with catalytically active material.

In the inner space of the casing, a guide element 215 which consists of a flat disc and is both a distance away from the end wall 203b and a distance away from the catalyst element and whose side facing the end wall 203b forms a flat guide surface 215a is arranged between the end wall 203b and the catalyst element 207. An intermediate space is present between the edge of the guide element 215 and the lateral wall 203a of the casing. The guide element 215 is fastened to the lateral wall 203a and/or to the end wall 203b of the casing by means of fastening elements which are not shown. The guide element 215 is, except for a few holes possibly provided for fastening the guide element and penetrated by the fastening elements, compact—i.e. free of holes—and impermeable to gas, The intermediate space present between the lateral wall 203a and the guide element 215 forms an annular gap which is possibly divided into sectors by the mentioned fastening element.

The inlet opening 221 bordered by the inlet 203d enters, at the orifice surface 223 lying in the same plane as the counter-surface 203i, the deflection cavity 225 which is present between the guide surface 215a and the counter-surface 203i and which is connected around the edge of the guide element 215 to the end cavity 227 present between said element and the end surface and/or exhaust gas entry surface 207a. An end cavity 229 which communicates with the outlet opening 231 bordered by the outlet 203e is present between the end wall 203e and the end surface and/or exhaust gas exit surface 207b. The ratio between the axial distance of the guide surface 215a from the counter-surface 203i and from the orifice surface 223 and between the internal diameter of the cylindrical section of the inlet 203d may be in the same range of values as in the case of the catalytic converter 1. The ratio of the radius of curvature in the axial section of the transition surface section connecting the cylindrical inner surface section of the inlet to the counter-surface 203i to the internal diameter of the inlet can likewise be in the range stated for the catalytic converter 1. The distance of the surfaces of the element 201 from one another and from the guide element 215 is preferably greater than the distance between the surfaces 203i, 215a.

During operation, the exhaust gas flowing through the inlet opening 221 in the deflection cavity 225 is deflected in a radial direction with respect to the axis 205 by the guide surface 215a, then flows around the edge of the guide element 215 into the cavity 227, then in an axial direction through the catalyst element 207 into the cavity 209 and from there through the outlet opening 231 and out of the casing 203. On flowing into the casing 203 of the catalytic converter 201, the exhaust gas may, as in the case of catalytic converter 1, have been deflected with small pressure loss and have been distributed in the cavity 227 uniformly over the end surface and/or exhaust gas entry surface 207a.

Figure 13:
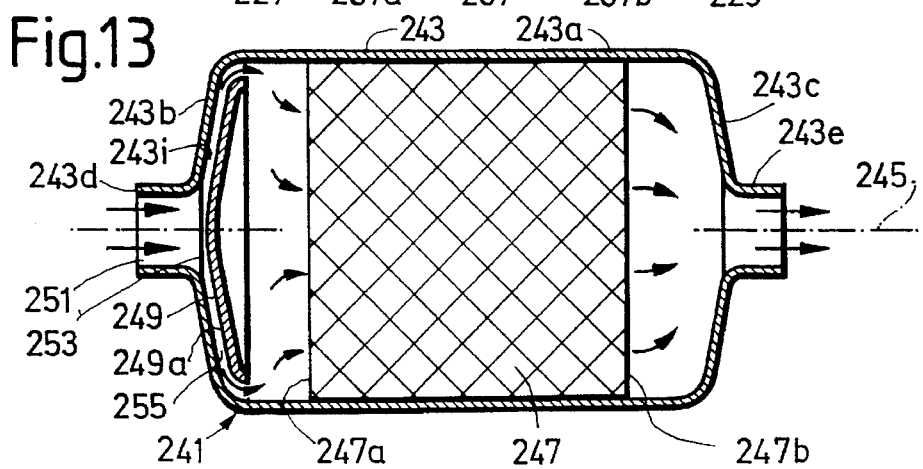

The catalytic converter 241 shown in FIG. 13 has a casing 243 which, for example, is generally rotationally symmetric to the axis 245 and has a cylindrical lateral wall 243a and two ends walls 243b, 243c with an inlet 243d and outlet 243e. As, for example, in the case of catalytic converters 1, 201, the inlet and the outlet consist of a connection having a cylindrical section which is connected to the relevant end wall by a transition section extending in an arc-like manner. In the catalytic converter 241, the end walls 243b, 243c are inclined and, after the transition sections of the connections, have a conical main section which is connected at its outer end to the lateral wall 243a via a bent transition section. The inner surface of the end wall 243d forms a counter-surface 243i. The catalyst element 247 which has an end surface and/or exhaust gas entry surface 247a and an end surface and/or exhaust gas exit surface 247b and is gas-permeable in the axial direction is arranged in the casing 243. The guide element 249 arranged between the end wall 243b and the element 247 has a guide surface 249a facing the end wall 243b. That section of the guide surface 249a which is opposite the conical section of the end wall 243b is likewise conical and, in the sections through the axis 245, is parallel to the counter-surface 243i opposite it. That central section of the guide surface 249a which is located in the region of the inlet 243d in an axial projection is, for example, rounded in axial section so that it has a continuous connection with the conical section but could instead be likewise conical or flat and at right angles to the axis 245. The edge section of the guide surface is, for example, bent toward the element 247.

The inlet opening 251 bordered by the inlet 243b enters the inner space of the casing at an orifice surface 253. Here, the orifice surface 253 is understood as meaning the flat circular surface which is at right angles to the axis 245 and whose edge is located at the outer edge of the transition surface section of the inner inlet surface, which transition surface section extends in an arc-like manner. As in the case of the catalytic converters described above, the guide surface 249a may be completely outside the inlet opening, i.e. on its side facing away from the flat orifice surface 253. However, it would also be possible for the central section of the guide surface 249a to project slightly into the inlet opening. In this case, however, the guide surface should of course be a distance away at least from the edge of the orifice surface 253 and from the counter-surface 243i. The space present between the guide surface 249a and the counter-surface 243i once again serves as a deflection cavity 255. The guide surface 249a and the counter-surface 243i or—more precisely—the conical sections of these surfaces, which sections are therefore flat in axial section, make an angle of not more than 30° with the orifice surface 253 and accordingly an angle of at least 60° and, for example, at least 70° to about at most 85° with the axis 245. For the sake of clarity, it is noted that the distance of the guide surface 249a from the counter-surface 243i and from the edge of the orifice surface 253 in the catalytic converter 241 is understood, in accordance with the usual definition of distance, as the length of the shortest connection between the opposite surfaces, and that this distance is therefore not parallel to the axis 245 but at right angles to the surfaces 249a, 243i. The ratio between the distance measured in this manner and the internal diameter of the inlet can then be in the same range as stated for the ratio $h/d_i$ in the case of catalytic converter 1. Otherwise, the catalytic converter 241 is similar to the catalytic converter 201.

The catalytic converter 301 shown partially in FIGS. 14 and 15 is substantially similar to the catalytic converter 201 and has a casing 303 with an inlet 303d. At least the inlet of the casing is rotationally symmetric with respect to the axis 305. The casing 303 contains a catalyst element 307 which is gas-permeable in the axial direction and one of whose flat end surfaces serves as exhaust gas entry surface 307a. The casing furthermore contains a guide element 315 which consists of a circular disc and has a guide surface 315a. However, the guide element 315 differs from the guide element 215 of catalytic converter 201 in that it has a number of open holes 315b which are distributed around the axis 305, over an outer, annular surface region. The latter encloses a compact, i.e. hole-free, inner, central surface region whose diameter is at least equal to the inlet internal diameter $d_i$ and is preferably larger than it. The diameter of the holes 315b is substantially smaller than the inlet internal diameter $d_i$ and is, for example, not more than 20% of the latter. The total surface area occupied by the holes 315b is preferably not more than 30% and, for example, 5% to 25% of the total guide surface 315a.

When catalytic converter 301 is used, the exhaust gas flowing through the inlet 303d into the inner space of the casing 303 is deflected in an approximately radial direction in the orifice section of the inlet and in the deflection cavity 325 by the guide surface 315a. A large part of the exhaust gas then flows, as in the case of catalytic converter 201, around the edge of the guide element into the cavity 327 present between this and the catalyst element 307. However, a part of the exhaust gas flows from the deflection cavity 305 through the holes 315b into the cavity 327 and thus helps to produce a uniform distribution of the exhaust gas over the cross-sectional area of the catalyst element 307.

The catalytic converter 341 shown in part in FIG. 16 has a casing 343 with a lateral wall 343a, an end wall 343b and an inlet 343d which is rotationally symmetric with respect to the axis 345 of the casing. The casing 343 contains a catalyst element 347 which is gas-permeable in the axial direction and has a flat exhaust gas entry surface 347a. The casing contains a main guide element 349 consisting of a flat disc. This element forms a guide surface 349a and is provided in the center with an open hole 349b which is coaxial with the axis 345 whose diameter is smaller than the inlet internal diameter $d_i$ and is, for example, 10% to 50% thereof. An additional guide element 351 which consists of a flat disc and is a distance away from both the guide element 349 and the exhaust gas entry surface 347a is arranged between the guide element 349 and the exhaust gas entry surface 347a. The additional guide element 351 has a guide surface 351a facing the inlet and the main guide element and, apart from any holes serving for its fastening and at least substantially filled by fastening elements, is compact and hole-free. The additional guide element 351 is hole-free, particularly in its central region located behind the hole 349b in axial projection. In axial projection, the main guide element 349 projects, along its entire circumference, beyond the additional guide element 351. The lateral wall 343a has, for example, a circular cylindrical shape. The main guide elements 349 and the additional guide elements 351 are then circular, the diameter of the additional guide element 351 being smaller than that of the guide element 349.

The exhaust gas flowing through the inlet 343d into the inner space of the casing 343 is largely deflected in an approximately radial direction in the inlet orifice section and in the deflection cavity present between the end wall 343b and the main guide element 349, and then flows around the edge of the main guide element 349 to the exhaust gas entry surface 347a. However, a part of the exhaust gas flowing through the inlet flows through the central hole 349b of the main guide element 349, is then deflected by the additional guide element 351 in an approximately radial direction and finally it flows around the edge of the additional guide element 351 to the exhaust gas entry surface 347a.

The catalytic converter 361 shown partially in FIG. 17 has a casing 363 whose end wall 363b is provided in the center with an inlet 363d. The casing contains a catalyst element 367 which is gas-permeable in the axial direction and has a flat exhaust gas entry surface 367a and a main guide element 367. The latter has a guide surface 367a facing the end wall 363b and a hole 369b in the center. Two additional guide elements 371, 373 are arranged between the main guide element 369 and the element 367. The three guide elements are a distance away from the end wall 363b, from one another and from the exhaust gas entry surface 367a. The additional guide element 371 present between the main guide element 369 and the additional guide element 373 has a guide surface 371a and a hole 371b in the center. The additional guide element 373 has a guide surface 373a and, apart from holes serving for its fastening, is hole-free. The contour dimensions of the guide element decrease from the main guide element to the closest additional guide element present in the catalyst element. The diameter of the hole 369b is preferably smaller than the inlet internal diameter $d_i$.

Furthermore, the diameter of the hole 371b is smaller than that of the hole 369b.

During operation of the catalytic converter 361, a part of the exhaust gas flowing through the inlet 363d into the inner space of the casing 363 is deflected by the guide surface 369a. The remaining exhaust gas flows through the hole 369b. A part of this exhaust gas is then deflected by the guide element 371. Furthermore, a further part of the exhaust gas flows through the hole 371b and is then deflected by the guide element 373.

Figure 18:
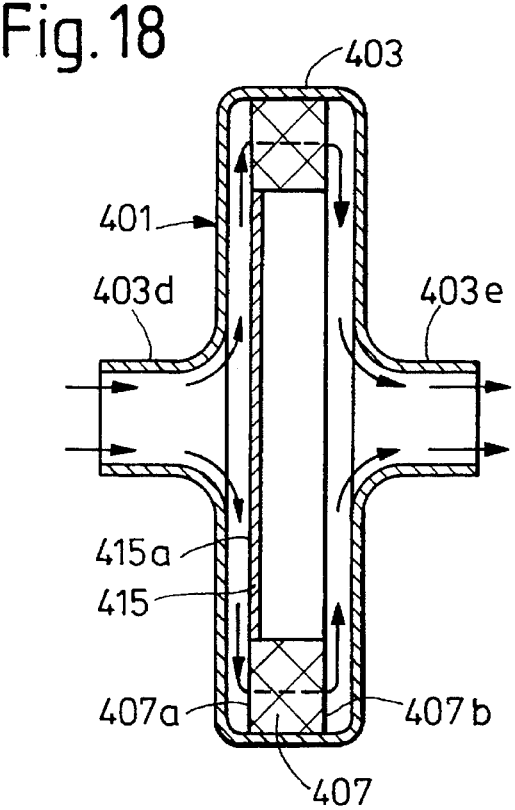

The catalytic converter 401 shown in FIG. 18 has a casing 403 with an inlet 403d and an outlet 403e. An annular catalyst element 407 which is gas-permeable in the axial direction and has a flat exhaust gas entry surface 407a and a flat exhaust gas entry surface 407b is arranged in the casing. The cavity enclosed via the catalyst element is tightly closed by a guide element 415 at its end facing the inlet. The said guide element has a flat guide surface 415a on its side facing the inlet. This guide surface is flush with the exhaust gas entry surface 407a but could also be located closer to the inlet than the exhaust gas entry surface 407a.

During operation of the catalytic converter 401, the exhaust gas flowing through the inlet into the inner space of the casing 403 is deflected in the radial direction of the guide surface 415a and then flows in the axial direction through the catalyst element.

Figure 19:
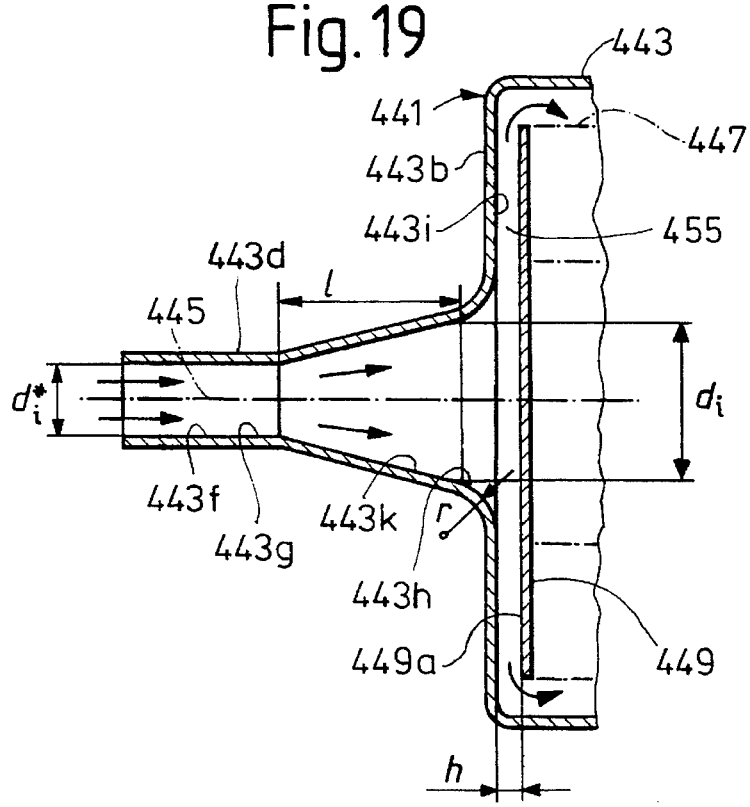

The catalytic converter 441 shown in part in FIG. 19 has a casing 443 with a flat end wall 443b in whose center an inlet 443d is present. Its inner surface 443f has a cylindrical inner surface section 443g which is contiguous with a conically widening inner surface section 443k. Its other end is continuously connected by a transition surface section 443h widening in axial section, to the flat, radial counter-surface 443i formed by the inner surface of the end wall 443b. The guide element 449 having a flat guide surface 449a facing the counter-surface 443i is present in the casing. Furthermore, the catalyst element 449 indicated by a dash-dot line is present in the casing and may be formed, for example, similarly to the catalyst element 7. In FIG. 19, $d_i$ designates the diameter of the inlet inner surface and the narrower end of the arc-like transition surface section 443h. Furthermore, $d_i^*$ designates the diameter of the cylindrical inner surface section 443f and of the narrower end of the conical inner surface section 443k. In this embodiment of the catalytic converter, the internal diameter $d_i$ is therefore slightly larger than the internal diameter of the inlet, which diameter is equal to the internal diameter $d_i^*$. FIG. 19 also shows the radius of curvature r at a distance h, which has the same meaning as in the embodiments described above. The ratios $r/d_i$ and $h/d_i$ in the catalytic converter 441 may be, for example, preferably in the same ranges as in the case of catalytic converter 1. The angle made by the conical inner surface section 443k with the axis 445 is preferably at least 5°, preferably not more than 25° and, for example, 10° to 20°. The length 1 of the conical inner surface section is preferably at least 100% and preferably not more than 300% of the diameter $d_i^*$. The flow resistance can be additionally reduced by the conical inner surface section 443k widening in the direction of flow. The pressure loss coefficient Z may then be in the range from 0.3 to 0.4, for example with a ratio $r/d_i$ of approximately 0.3 at the minimum of a curve which corresponds to the curves shown in FIG. 4.

Unless stated otherwise above, the ratios $r/d_i$ and $h/d_i$ may be in the same ranges as in the case of the catalytic converter 1 described with reference to FIGS. 1 to 3, not only in the catalytic converter 441 shown in FIG. 19 but also in all other catalytic converters described with reference to FIGS. 5 to 18. The same also applies to the dimensions of the guide surface and also to some other dimensions.

The catalytic converters and their use can also be modified in other respects. For example, features of different catalytic converters described with reference to the Figures can be combined with one another. The lateral walls of the casings and the catalyst elements of the catalytic converters 1, 41, 61, 161, 201, 241, 301, 341, 361, 401, 441 can, for example, have an oval or elliptical contour as in the case of catalytic converter 101. Conversely, the lateral walls of the casings and the catalyst elements of the catalytic converters 101, 141 can be formed with a circular contour. The lateral walls of the casings and the catalyst elements may even have a polygonal contour.

Furthermore, in the case of the catalytic converters 101 and 141, the orifice of the inlet or of the outlet can, in a view corresponding to FIG. 8, be arranged in the center of one casing end wall and of the catalyst element and/or the inner lateral surfaces 107b or 147b can be made to form a circular cylindrical shape and to be coaxial with the axis of 10 that section of the inlet or of the outlet 103e and 143e, respectively, which is connected to an end wall and projects away therefrom. The inlet 143d of the catalytic converter 141 may then pass through a hole additionally made in the catalyst element.

The catalytic converter 61 can, for example, be modified so that the internal diameter of both catalyst elements are made the same size and/or the external diameter of both catalyst elements are made different sizes.

Furthermore, the straight inlet and/or outlet of the catalytic converters 1, 41 and of other catalytic converters described with reference to the Figures can, as in the case of catalytic converter 101, be provided with a bend. Conversely, the bend can be omitted in the case of the inlet of the catalytic converters 101, 141, 161. This is advantageous, for example, particularly when the catalytic converter is intended for installation in an automobile whose internal combustion engine has an exhaust gas outlet directed at right angles to the direction of driving. The inlet of the catalytic converter can then be connected via a short, at least essentially straight connection to the exhaust gas outlet of the internal combustion engine, and the outlet of the catalytic converter can be connected by a pipe running parallel to the direction of driving and more or less straight backwards, to a sound insulator of the exhaust system.

Furthermore, the edge sections of the guide surfaces and counter-surfaces present in the catalytic converters 1, 41, 61, 101, 161 may be bent similarly to the catalytic converter 241. The same also applies to the guide surfaces of the catalytic converters shown in FIGS. 14 to 19. The guide surfaces and counter-surfaces are then only essentially and for the major part, i.e. with the exception of the bent edge sections, flat and at right angles to the axes of the inlets.

In the case of catalytic converter 1, the functions of the inlet and of the outlet may be interchanged so that the exhaust gas flows through the catalytic converter in a direction opposite to that indicated by the arrows.

In the case of the guide elements 349, 369, holes corresponding to the holes 315b of the guide element 315 could also be provided. The generally conical guide elements 349 shown in FIG. 13 could likewise be provided with holes arranged analogously to the holes 315b of the guide element 315 and/or with a central hole, and in the latter case at least one conical additional guide element would then be provided, analogously to the catalytic converters shown in FIGS. 16 and 17.

Furthermore, the inlets and possibly also the outlets in all catalytic converters described with reference to FIGS. 1 to 18 can be provided with a conical inner surface section which is formed analogously to the conical inner surface section 443k of the catalytic converter shown in FIG. 19.

Instead of forming a catalyst element according to FIG. 3 from wavy discs 9, 11 directly adjacent to one another, a flat, perforated disc could be arranged between two such discs. Furthermore, the discs 9, 11 can be arranged so that their waves are not at right angles to one another but intersect at another angle which, however, should preferably be at least about 45° and, for example, at least 60°.

Moreover, for the formation of a catalyst element which is gas-permeable in the radial direction, it would be possible to provide annular discs with a ring of radial waves which then become broader in an outward direction. A compact or possibly perforated, annular disc which is flat or provided with circular waves can then be arranged between two circular discs.

Furthermore, instead of discs having metallic carriers, a catalyst element which is gas-permeable in the radial direction can have a carrier which consists of a ceramic material and is provided with radial passages.

Furthermore, it is possible to provide an annular or sleeve-like catalyst element whose passages should not make a right angle with its axis but another angle which, however, should preferably be at least about 45° and, for example, at least 60°. The passages can then run in general along conical surfaces. The inner lateral surface and the outer lateral surface of the annular or sleeve-like catalyst element may then be conical so that they are at right angles to the passages joining them and hence make, with a radial plane at right angles to the axis, an angle which is preferably at least 45° and, for example, at least 60° and namely equal to the angle made by the passages with the axis.

What is claimed is:

1. A catalytic converter for catalytic treatment of exhaust gas comprising:

a casing having an inner space, an inlet communicating with the inner space and having an orifice for conducting the exhaust gas into the inner space, and an outlet, a gas-permeable catalyst element located in the inner space for catalytic treatment of the exhaust gas entering the inner space, a guide surface located within the inner space for guiding the exhaust gas to the catalyst element, and a counter-surface encompassing the orifice and located opposite the guide surface;

wherein the inlet has an axis and comprises an inner surface section that is one of substantially cylindrical and substantially conical and makes, when the inner surface section is substantially conical, an angle of at most 25° with the axis and has an internal diameter $d_i$ at an end thereof nearer to the orifice, wherein the inlet has a transition surface section for continuously connecting the inner surface section thereof with the counter-surface, the transition surface section curving and widening toward the counter-surface in a section through the axis, wherein the guide surface is located opposite the orifice, the transition surface section and the counter-surface, at least major parts of the guide and counter-surfaces forming angles of at least 60° with the inlet axis, wherein the guide surface is spaced from the counter-surface, at a portion thereof adjacent to a wider end of the transition surface, a distance h equal at most 70% of the internal diameter $d_i$ of the inner surface section of the inlet, wherein the guide surface limits, together with the counter-surface, a deflection cavity and is shaped such that at least a substantial part of the exhaust gas supplied to the catalytic converter is lead through the deflection cavity in a direction directed away from the axis to a border section of the deflection cavity before the exhaust gas enters into the catalyst element, and wherein the border section surrounds the orifice at a radial distance of the axis which is at least 1.5 times of the internal diameter $d_i$.

2. Catalytic converter according to claim 1, wherein the transition surface section is rotationally symmetric with respect to the stated axis and wherein the radius of curvature r of the transition surface section, measured in the stated section, through said axis is at least 10% of said internal diameter $d_i$ of the inlet.

3. Catalytic converter according to claim 2, wherein the radius of curvature r is at least 20% of the internal diameter $d_i$.

4. Catalyst converter according to claim 1, wherein said angles made by at least the major part of said guide surface and said counter-surface with said axes are at least 70°, wherein the transition surface section is rotationally symmetric with respect to the stated axis and wherein the distance h is at least 10% of the internal diameter $d_i$ of the inlet.

5. Catalytic converter according to claim 1, wherein the distance h is at least 15% of the internal diameter $d_i$.

6. Catalytic converter according to claim 1, wherein the distance h is at least 15% and not more than 25% of the internal diameter $d_i$.

7. Catalytic converter according to claim 1, wherein one of the guide surface and counter-surface has an edge that is a distance from the stated axis which is at least 1.5 times the internal diameter $d_i$ and wherein said catalyst element is arranged in such a way that at least a substantial part of the exhaust gas supplied to the catalytic converter flows from the deflection cavity around this last mentioned edge before it enters the catalyst element.

8. Catalytic converter according to claim 7, wherein the distance to the edge of the stated surface from the stated axis is at least 2.5 times the internal diameter $d_i$.

9. Catalytic converter according to claim 1, wherein the guide surface and the counter-surface are essentially flat, at right angles to the stated axis and spaced by said distance h.

10. Catalytic converter according to claim 1, wherein the catalyst casing has a lateral wall and the catalyst element has an outer lateral surface, wherein the catalyst element has an inner lateral surface enclosing an inner cavity and has a number of discs arranged one upon another, wherein each disc comprises a metal sheet provided on both sides with coatings comprising catalytically active material, and wherein at least every second disc comprises waves forming an angle with the axis so that the discs passages for the exhaust gas which lead from the outer lateral surface substantially along planes which are perpendicular to said axis to the inner lateral surface, wherein an outer cavity which communicates with the deflection cavity is present between the lateral wall of the casing and the outer lateral surface of the element and wherein the guide surface is formed in such a way that all the exhaust gas supplied to the catalytic converter flows from the deflection cavity into the outer cavity before it enters the catalyst element.

11. Catalytic converter according to claim 1, wherein the casing has a lateral wall and contains two annular catalyst elements, each having an outer lateral surface, an inner lateral surface and passages for the exhaust gas which lead from the inner lateral surface to the outer lateral surface, wherein the two elements are located within an outer cavity and the outer cavity is located between the lateral wall and the outer lateral surfaces of the two elements, wherein a cavity enclosed by the inner lateral surface of a first element is separated by a guide element forming the guide surface from a cavity enclosed by the inner lateral surface of the second element and wherein this cavity is connected to the outlet.

12. Catalytic converter according to claim 1, wherein the casing has a lateral wall and two end walls, wherein the inlet enters the inner space of the casing at a first end wall and the outlet enters the inner space at the other, second end wall, wherein the catalyst element is has two end surfaces which are connected to one another by passages for the exhaust gas and one of which serves as exhaust gas entry surface and the other serves as exhaust gas exit surface, and wherein the guide surface is arranged between the first end wall and the exhaust gas entry surface and is formed by a guide element separated from the exhaust gas entry surface by an intermediate space into which the exhaust gas can flow before it enters the catalyst element.

13. Catalytic converter according to claim 12, wherein the guide element has at least one hole.

14. Catalytic converter according to claim 1, wherein said inner surface section of the inlet, widens conically towards said transition section and makes an angle of not more than 20° with the stated axis.

15. Catalytic converter according to claim 1, wherein the outlet enters the inner space of the casing at an outlet orifice and has an outlet axis and an inner surface with an arcuate transition surface section which extends towards the outlet orifice in a section through the outlet axis.

16. Catalytic converter according to claim 1, wherein the catalyst element has a number of discs which have waves extending along planes which are perpendicular to said axis.

17. Catalytic converter according to claim 1, wherein said inner surface section of the inlet is substantially cylindrical or substantially conical.

18. Catalytic converter according to claim 1, wherein the guide surface and the counter-surface have conical sections which are opposite to one another and which are parallel to one another in an axial section and spaced in an axial direction by said distance h.

19. Catalytic converter according to claim 1, wherein the casing has a lateral wall and two end walls, wherein the inlet enters the inner space of the casing at a first end wall and the outlet enters at the other, second end wall, wherein the catalytic element is annular and has two end surfaces which are connected to one another by passages for the exhaust gas and one of which serves as exhaust gas entry surface and the other serves as exhaust gas exit surface, and wherein the guide surface is flush with the exhaust gas entry surface.

20. A catalytic converter for catalytic treatment of exhaust gas, comprising:
a casing including a lateral wall, first and second end walls located on opposite sides of the lateral wall and defining an inner space of the casing therebetween, an inlet communicating with the inner space for conducting the exhaust gas into the inner space, and an outlet;
a gas-permeable catalyst element located in the inner space for catalytic treatment of the exhaust gas entering the inner space; and
a guide element located in the inner space for guiding the exhaust gas to the catalyst element;
wherein the first end wall has an orifice communicating the inlet with the inner space and an inner side surface encompassing the orifice and defining a counter-surface;
wherein the inlet has an axis and comprises an inner surface section that is one of substantially cylindrical and substantially conical and makes, when the inner surface section is substantially conical, an angle of at most 25° with the axis and has an internal diameter $d_i$ at an end thereof nearer to the orifice,
wherein the inlet has a transition surface section for continuously connecting the inner surface section thereof with the counter-surface, the transition surface section curving and widening toward the counter-surface in a section through the axis,
wherein the guide element has a guide surface located opposite the orifice, the transition surface section and the counter-surface for guiding the exhaust gas along the counter-surface, at least major parts of the guide and counter surfaces forming angles of at least 70° with the inlet axis,
wherein the guide surface is spaced from the counter-surface, at a portion thereof adjacent to a wider end of the transition surface section, a distance h equal at most 25% of the internal diameter $d_i$ of the inner surface section of the inlet,
wherein the guide surface limits, together with the counter-surface, a deflection cavity and has a shape such that at least a substantial part of the exhaust gas supplied to the catalytic converter is led through the deflection cavity in a direction directed away from the axis to a border section of the deflection cavity before the exhaust gas enters into the catalyst element, and
wherein the border section surrounds the orifice at a radial distance of the axis which is at least 1.5 times of the internal diameter $d_i$.

21. A catalytic converter for catalytic treatment of exhaust gas comprising:
a casing including a lateral wall, first and second end walls located on opposite sides of the lateral wall and defining an inner space of the casing therebetween, an inlet communicating with the inner space for conducting the exhaust gas into the inner space, and an outlet;
a gas-permeable catalyst element located in the inner space for catalytic treatment of the exhaust gas entering the inner space; and
a guide element located in the inner space for guiding the exhaust gas to the catalyst element,
wherein the first end wall has an orifice communicating the inlet with the inner space and an inner side surface encompassing the orifice and defining a counter surface;
wherein the inlet has an axis and comprises an inner surface section that is one of substantially cylindrical and substantially conical and makes when the inner surface section is substantially conical, an angle of at most 25° with the axis and has an internal diameter $d_i$ at an end thereof nearer to the orifice,
wherein the inlet has a transition surface section for continuously connecting the inner surface section of the inlet with the counter-surface, the transition surface section curving and widening toward the counter-surface in a section through the axis,
wherein the guide element has a guide surface located opposite the orifice, the transition surface section and the counter surface for guiding the exhaust gas along the counter-surface, at least major parts of the guide surface and of the counter-surface forming angles of at least 70° with said axis, wherein the guide surface is spaced from the counter-surface, at a portion thereof adjacent to a wider end of the transition surface section, a distance h equal at most 70% of the internal diameter $d_i$ of the inner surface section of the inlet;

wherein the guide surface limits, together with the counter-surface, a deflection cavity, wherein the catalyst element is one of annular and sleeve shaped, has an outer lateral surface, an inner lateral surface and a number of discs arranged one on the other, each disc comprising a metal sheet provided on both sides with coatings comprising catalytically active material, and at least every second disc having waves forming an angle with the axis such that the discs define passages for the exhaust gas which lead from the outer lateral surface of the catalytic element to the inner lateral surface thereof, wherein the lateral wall of the casing and the outer lateral surface of the catalyst element define an outer cavity therebetween which communicates at one end with the deflection cavity, wherein the guide surface is shaped such that the exhaust gas supplied to the catalytic converter is led through the deflection cavity in a direction directed away from the axis and flows into the outer cavity before it enters the catalyst element at the outer lateral surface thereof, and wherein the inner lateral surface of the catalyst element encompasses an inner cavity that is connected with the outlet.

22. Catalytic converter according to claim 21, wherein said distance h is 15% to 25% of said internal diameter $d_1$.

23. Catalytic converter according to claim 21, wherein the waves extend along planes which are perpendicular to said axis.

24. A catalytic converter for catalytic treatment of exhaust gas, comprising;

a casing including a lateral wall, first and second end walls located on opposite sides of the lateral wall and defining an inner space of the casing therebetween, an inlet communicating with the inner space for conducting the exhaust gas into the inner space, and an outlet;

a gas-permeable catalyst element located in the inner space for catalytic treatment of the exhaust gas entering the inner space; and a guide element located in the inner space for guiding the exhaust gas to the catalyst element, wherein the first end wall has an orifice communicating the inlet with the inner space and an inner side surface encompassing the orifice and defining a counter surface;

wherein the inlet has an axis and comprises an inner surface section that is one of substantially cylindrical and substantially conical and makes, when the inner surface section is substantially conical, an angle of at most 25° with the axis and has an internal diameter $d_i$ at an end thereof nearer to the orifice, wherein the inlet has a transition surface section for connecting the inner surface section thereof with the counter-surface, the transition surface section curving and widening toward the counter-surface in a section through the axis, wherein the guide element has a guide surface located opposite the orifice, the transition surface section and the counter-surface for guiding the exhaust gas along the counter-surface, at least major parts of the guide surface and of the counter-surface forming angles of at least 70° with the axis, wherein the guide surfaces is spaced from the counter-surface, at a portion thereof adjacent to a wider end of the transition surface, a distance h equal at most 70% of the internal diameter $d_i$ of the inner surface section of the inlet;

wherein the guide surface limits, together with the counter-surface, a deflection cavity, wherein the catalyst element is one of annular and sleeve shaped, has an outer lateral surface, an inner lateral surface and a number of discs arranged one on the other, each disc comprising a metal sheet provided on both sides with coatings comprising catalytically active material, and at least every second disc having waves forming an angle with the axis whereby the discs define passages for the exhaust gas which lead from the outer lateral surface to the inner lateral surface of the catalytic element, wherein the lateral wall of the casing and the outer lateral surface of the catalyst element define an outer cavity therebetween which communicates at one end with the deflection cavity, wherein the inner surface of the lateral wall and the outer lateral surface of the catalyst element approach one another in a direction directed away from the deflection cavity so that the cross-sectional area of the outer cavity decreases in said direction, and wherein the guide surface is formed in such a way that the exhaust gas supplied to the catalytic converter is led through the deflection cavity in a direction directed away from the axis and flows into the outer cavity before it enters the catalyst element at the outer lateral surface thereof.

25. A catalytic converter for catalytic treatment of exhaust gas, comprising:

a casing including a lateral wall, first and second end walls located on opposite sides of the lateral wall and defining an inner space of the casing therebetween, an inlet communicating with the inner space for conducting the exhaust gas into the inner space, and an outlet;

a gas-permeable catalyst element located in the inner space for catalytic treatment of the exhaust gas entering the inner space; and a guide surface located within the inner space for guiding the exhaust gas to the catalyst element, wherein the first end wall has an orifice communicating the inlet with the inner space and an inner side surface encompassing the orifice and defining a counter-surface wherein the inlet has an axis and comprises an inner surface section that is one substantially cylindrical and substantially conical and makes, when the inner surface section is substantially conical, an angle of at most 25° with the axis and has an internal diameter $d_i$ at an end thereof nearer to the orifice, wherein the inlet has a transition surface section for continuously connecting the inner surface section thereof with the counter-surface, the transition surface section curving and widening toward the counter-surface in a section through the axis, wherein the guide surface is located opposite the orifice, the transition surface section and counter surface for guiding the exhaust gas along the counter-surface, and wherein, at the end of the catalytic element being further away from the orifice, at least major parts of the guide surface and the counter surface forming angles of at least 60° with the axis, wherein the guide surface is spaced from the counter-surface and, at a portion thereof adjacent to wider end of the transition surface section, a distance h equal at the most 100% of the internal diameter $d_i$ of the inner surface section of the inlet, wherein the catalyst element is one of annular and sleeve-shaped and has an inner lateral surface, an outer lateral surface, two ends and passages for the exhaust gas which lead from the inner lateral surface to the outer lateral surface, the inner lateral surface being radially spaced from the axis a distance which is equal at least 1.5 times of the internal diameter $d_i$ of the inner surface section of the inlet, each disc comprising a metal sheet provided on both sides with coatings comprising catalytically active material, and at least every second disc having waves forming an angle with the axis so that the discs form the passages, wherein the guide surface defines, together with the counter-surface and the inner lateral surface of the catalyst element, a deflection cavity, wherein the lateral wall of the casing and the outer lateral surface of the catalyst element define an outlet cavity therebetween, and wherein the guide surface is shaped such that the exhaust gas supplied to the catalytic converter is led through the deflection cavity in a direction directed away from the axis to the inner lateral surface of the catalyst element before the exhaust gas enters into the catalyst element and flows therethrough to the outer cavity.

26. Catalytic converter according to claim 25, wherein said distance h is at most 70% of said internal diameter $d_i$.

27. Catalytic converter according to claim 25, wherein a second one of said end walls forms on the inner side thereof said guide surface and wherein said outlet opens into said outer cavity.

28. A catalytic converter for catalytic treatment of exhaust gas, comprising:

a casing including a lateral wall, first and second walls located on opposite sides of the lateral wall and defining an inner space of the casing therebetween, an inlet communicating with the inner space for conducting the exhaust gas into the inner space, and an outlet;

a gas-permeable annular catalyst element located in the inner space for catalytic treatment of the exhaust gas entering the inner space, the catalyst element having outer and inner lateral surfaces, and a terminating element located inside the inner space for limiting, together with the first end wall and the inner lateral surface of the catalyst element, an inner cavity, the terminating element having an orifice for communicating the inlet with the inner space, wherein the inlet has an axis and comprises an inner surface section that is one of substantially cylindrical and substantially conical and makes, when the inner surface section is substantially conical, an angle of at most 25° with the axis and has an internal diameter $d_i$ at an end thereof nearer to the orifice, wherein the catalyst element has a number of discs arranged one on the other, each disc comprising a metal sheet provided on both sides with coatings comprising catalytically active material, and at least every second disc having waves forming an angle with the axis so that the discs define passages for the exhaust gas which lead from the outer lateral surface to the inner lateral surface, wherein the inlet penetrates through the first end wall and through the inner cavity to said orifice provided at terminating element, wherein the terminating element forms a counter-surface encompassing the orifice and has an edge surrounding the orifice and spaced from the axis at a radial distance which is at least 1.5 times of the internal diameter $d_i$ of the inner surface section of the inlet, wherein the second end wall forms a guide surface that is opposite to the orifice and the counter-surface, wherein at least major parts of the guide surface and of the counter-surface are planar and extend perpendicular to the axis, wherein said inner surface section of the inlet is continuously connected with the counter-surface by a transition surface section which curves and widens toward the counter-surface in a section through the axis, wherein said planar parts of the guide surface and of the counter-surface are spaced from each other a distance h equal at most 70% of the internal diameter $d_i$ of the inner surface of the inlet, wherein the guide surface defines, together with the counter-surface, a deflection cavity, lateral surface of the catalyst element define an outer cavity connected with the deflection cavity, wherein the outlet opens into the inner cavity, and wherein the guide surface is shaped such that the exhaust gas supplied to the catalytic converter is lead through the deflection cavity in a direction directed away from the axis to the edge of the terminating element and into the outer cavity before the exhaust gas enters into the catalyst element.

29. Catalytic converter according to claim 28, wherein said distance h is 15% to 25% of said internal diameter $d_i$.

30. A catalytic converter for catalytic treatment of exhaust gas, comprising:

a casing including a lateral wall, first and second end walls located on opposite sides of the lateral wall and defining an inner space of the casing therebetween, an inlet communicating with the inner space for conducting the exhaust gas into the inner space, and an outlet;

a gas-permeable catalyst element located in the inner space for catalytic treatment of the exhaust gas entering the inner space having two end surfaces connected by passages and serving, respectively, as exhaust gas entry and exit surfaces, and a guide element located in the inner space and having a guide surface for guiding the exhaust gas to the catalyst element, wherein the first end wall has an orifice communicating the inlet with the inner space, and an inner side surface encompassing the orifice and defining a counter-surface, wherein the inlet has an axis and comprises an inner surface section that is one of substantially cylindrical and substantially conical and makes, when the inner surface section is substantially conical, an angle of at most 25° with axis and has an internal diameter $d_i$ at an end thereof nearer to the orifice, wherein the inlet has a transition surface section for continuously connecting the inner surface section thereof with the counter-surface, the transition surface section curving and widening toward the counter-surface in a section through the axis, wherein the guide surface is located opposite the orifice, the transition surface section and the counter surface, at least major parts of the guide and counter surfaces forming angles of at least 70° with the inlet axis, wherein the guide surface is spaced from the counter-surface, at a portion thereof adjacent to a wider end of the transition surface, a distance h equal at most 70% of the internal diameter $d_i$ of the inner surface section of the inlet, wherein the guide surface limits, together with the counter-surface, a deflection cavity, and wherein the guide element has an edge and is separated from the exhaust gas entry surface of the catalyst element in an axial direction by an intermediate space in such a way that at least a substantial part of the exhaust gas supplied to the catalytic converter is lead through the deflection cavity in a direction directed away from the axis to the edge and glows around the edge into the intermediate space before the exhaust gas enters the catalyst element.

31. Catalytic converter according to claim 30, wherein said distance h is 15% to 25% of said internal diameter $d_i$.

32. Catalytic converter according to claim 30, wherein said guide element comprises at least one hole through which exhaust gas can flow.

33. A catalytic converter for a catalytic treatment of exhaust gas comprising:

a casing having an inner space, an inlet communicating with the inner space for conducting the exhaust gas into the inner space and having an orifice communicating the inlet with the inner space, and an outlet, a gas-permeable catalyst element located in the inner space for catalytic treatment of the exhaust gas entering the inner space, a guide surface located within the inner space for guiding the exhaust gas to the catalyst element, and a counter surface encompassing the orifice, wherein the inlet has an axis and comprises an inner surface section that is one of substantially cylindrical and substantially conical and makes, when the inner surface section is substantially conical, an angle of at most 25° with the axis and has an internal diameter $d_i$ at an end thereof nearer to the orifice, wherein the inlet has a transition surface section for continuously connecting the inner surface section thereof with the counter-surface, the transition surface section curving and widening toward the counter-surface in a section through the axis, wherein the guide surface is located opposite the orifice, the transition surface section and the counter-surface, at least major parts of the guide and counter-surfaces forming angles of at least 70° with the inlet axis, wherein the guide surface is spaced from the counter-surface, at a portion thereof adjacent to a wider end of the transition surface, a distance h equal at most 25% of the internal diameter $d_i$ of the inner surface section of the inlet, wherein the guide surface limits, together with the counter-surface, a deflection cavity and is shaped such that at least a substantial part of the exhaust gas supplied to the catalytic converter is lead through the deflection cavity in a direction directed away from the axis to a border section of the deflection cavity before the exhaust gas enters into the catalyst element, and wherein the border section surrounds the orifice at a radial distance of the axis which is at least 1.5 times of the internal diameter $d_i$.

34. Catalytic converter according to claim 33, wherein said transition surface section has, in a section through said axis, a radius of curvature r that is at least 10% of the internal diameter $d_i$ of the inlet and wherein the h is at least 10% of said internal diameter $d_i$.

35. Catalytic converter according to claim 34, wherein said radius of curvature r is at least 20% of said internal diameter $d_i$ and wherein said distance h is at least 15% of said internal diameter $d_i$.

36. Catalytic converter according to claim 34, wherein the lateral wall has an inner surface, wherein the guide element has an outer edge and wherein there is a gap between the inner surface of the lateral wall and the edge of the guide element, wherein the gas-permeable catalyst element has an entry surface for the exhaust gas and wherein the inner space of the casing comprises an additional cavity connected around the edge of the guide element with said deflection cavity and adjacent to said entry surface so that at least a substantial part of the exhaust gas supplied to the catalytic converter streams outwardly through said deflection cavity and is deflected around the edge of the guide element into the additional cavity before it enters the gas-permeable catalyst element at said entry surface.

37. Catalytic converter according to claim 33, wherein the guide surface and the counter-surface are substantially planar and perpendicular to said axis.

38. Catalytic converter according to claim 33, wherein said guide surface, said counter-surface and said deflection cavity extend a distance away from said axis which distance is at least 2.5 times said internal diameter $d_i$ of the inlet.

39. Catalytic converter according to claim 33, wherein the casing has a lateral wall and at each end the casing has an end wall, wherein said counter-surface is formed by the inner surface of one of said end walls and wherein the guide surface is formed by a guide element disposed inside the casing.

40. Catalytic converter according to claim 33, wherein the gas permeable element is at least one of annular and sleeve-shaped and has an inner lateral surface, an outer lateral surface, and a number of discs arranged one on the other, wherein each disc comprises a metal sheet provided on both sides with coatings comprising catalytically active material, and wherein at least every second disc comprises waves forming an angle with the axis so that the discs define passages which lead from the inner lateral surface to the outer lateral surface, and wherein said guide surface and said deflection cavity extend until said inner surface of said gas-permeable catalyst element.

41. A catalytic converter for a catalytic treatment of exhaust gas comprising:

a casing having an inner space, an inlet communicating with the inner space for conducting the exhaust gas into the inner space having an orifice for communicating the inlet with the inner space, and an outlet, a gas-permeable catalyst element located in the inner space for catalytic treatment of the exhaust gas entering the inner space, a guide surface located within the inner space for guiding the exhaust gas to the catalyst element, and a counter-surface encompassing the orifice, wherein the inlet has an axis and comprises an inner surface section that is one of substantially cylindrical and substantially conical and makes, when the inner surface section is substantially conical, an angle of at most 25° with the axis and has an internal diameter $d_i$ at an end thereof nearer to the orifice, wherein the inlet has a transition surface section for continuously connecting the inner surface section thereof with the counter-surface, the transition surface section curving and widening toward the counter-surface in a section through the axis and having a radius of curvature that is at least 20% of the internal diameter $d_i$ of the inner surface section of the inlet, wherein the guide surface is located opposite the orifice, the transition surface section and the counter surface, at least major parts of the guide and counter surfaces being planar and extending perpendicular to the axis, the planar parts of the guide and counter surfaces being spaced, in an axial direction, from each other by a distance h equal approximately 15–25% of the internal diameter $d_i$ of the inner surface section of the inlet;

wherein the guide surface limits, together with the counter-surface, a deflection cavity and is shaped such that the exhaust gas supplied to the catalytic converter is lead through the deflection cavity in a direction directed away from the axis to a border section of the deflection cavity before the exhaust gas enters into the catalyst element, and wherein the border section surrounds the orifice at a radial distance of the axis which is at least 1.5 times of the internal diameter $d_i$.

42. Catalytic converter according to claim 41, wherein the casing has a lateral wall and at each end of the lateral wall an end wall, wherein said counter-surface is formed by the inner surface of one of said end walls.

43. Catalytic converter according to claim 42, wherein the lateral wall has an inner surface, wherein the guide surface is formed by a guide element disposed inside the casing, wherein the guide element has an outer edge and wherein there is a gap between the inner surface of the lateral wall and the edge of the guide element, wherein the gas-permeable catalyst element has an entry surface for the exhaust gas and wherein the inner space of the casing comprising an additional cavity connected around the edge of the guide element with said deflection cavity and adjacent to said entry surface so that the exhaust gas is streaming outwardly through said deflection cavity and is deflected around the edge of the guide element into the additional cavity before it enters the gas-permeable catalyst element at said entry surface.

44. Catalytic converter according claim 42, wherein the gas-permeable catalyst element is at least one of annular and sleeve-like and has an inner, lateral surface, wherein said guide surface and said deflection cavity extend until said inner, lateral surface of said gas-permeable catalyst element, wherein said inner, lateral surface has a distance from said axis which distance is at least 1.5 times the internal diameter $d_i$ of the inlet at the narrower end of the transition surface section.

* * * * *